United States Patent
Yu et al.

(10) Patent No.: US 12,335,484 B2
(45) Date of Patent: Jun. 17, 2025

(54) ENCODING METHOD, DECODING METHOD, AND DECODER

(71) Applicants: ZHEJIANG UNIVERSITY, Zhejiang (CN); GUANGDONG OPPO MOBILE TELECOMMUNICATIONS CORP., LTD., Guangdong (CN)

(72) Inventors: Lu Yu, Guangdong (CN); Yaqing Pan, Guangdong (CN); Hualong Yu, Guangdong (CN); Zhihuang Xie, Guangdong (CN); Zhenyu Dai, Guangdong (CN)

(73) Assignees: ZHEJIANG UNIVERSITY, Zhejiang (CN); GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 120 days.

(21) Appl. No.: 18/458,579

(22) Filed: Aug. 30, 2023

(65) Prior Publication Data
US 2023/0412817 A1 Dec. 21, 2023

Related U.S. Application Data

(63) Continuation of application No. PCT/CN2021/078548, filed on Mar. 1, 2021.

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/176* (2014.11); *H04N 19/46* (2014.11)

(58) Field of Classification Search
None
See application file for complete search history.

(56) References Cited

U.S. PATENT DOCUMENTS

| | | | |
|---|---|---|---|
| 2018/0350110 A1* | 12/2018 | Cho | G06F 7/08 |
| 2021/0021823 A1 | 1/2021 | Na et al. | |
| 2022/0182604 A1* | 6/2022 | Kim | H04N 19/159 |

FOREIGN PATENT DOCUMENTS

| | | |
|---|---|---|
| CN | 107392305 | 11/2017 |
| CN | 109299722 | 2/2019 |

(Continued)

OTHER PUBLICATIONS

WIPO, International Search Report and Written Opinion for International Application No. PCT/CN2021/078548, Nov. 19, 2021.
(Continued)

*Primary Examiner* — Clifford Hilaire
(74) *Attorney, Agent, or Firm* — Hodgson Russ LLP

(57) ABSTRACT

Embodiments of the disclosure provide an encoding method, a decoding method, an encoder, a decoder, and a storage medium. The method includes the following. An encoding result of a current block, a target index for the current block, and a block-coding enable flag for the current block are obtained by parsing a bitstream. A feature map splicing order is obtained. When the block-coding enable flag is valid, target block-coding motion information corresponding to the target index is determined based on the feature map splicing order and pixel position information of the current block. The encoding result of the current block is decoded based on the target block-coding motion information.

20 Claims, 8 Drawing Sheets

(51) Int. Cl.
*H04N 19/176* (2014.01)
*H04N 19/46* (2014.01)

(56) References Cited

FOREIGN PATENT DOCUMENTS

| | | |
|---|---|---|
| CN | 110163370 | 8/2019 |
| CN | 110248191 | 9/2019 |
| CN | 110494892 | 11/2019 |

OTHER PUBLICATIONS

Chen et al., "Lossy Intermediate Deep Learning Feature Compression and Evaluation," Proceedings of the 27th ACM International Conference on Multimedia (MM '19), Oct. 2019.
Chen et al., "Toward Intelligent Sensing: Intermediate Deep Feature Compression," IEEE Transactions on Image Processing, 2020, vol. 29.

* cited by examiner

ENCODING METHOD, DECODING METHOD, AND DECODER

CROSS-REFERENCE TO RELATED APPLICATION(S)

This application is a continuation of International Application No. PCT/CN2021/078548, filed Mar. 1, 2021, the entire disclosure of which is incorporated herein by reference.

TECHNICAL FIELD

The present disclosure relates to the field of coding technology, and in particular to an encoding method, a decoding method, and a decoder.

BACKGROUND

With the development of computer technologies, there are more and more attention in fields related to computer vision. In recent years, image processing technologies have been successfully applied in various walks of life. In a process of coding feature maps, feature map data is sent to a traditional video encoder in form of YUV video data after passing through a pre-quantization module and a repacking module, to be subject to compression encoding, and a bitstream generated by the traditional video encoder is included in a feature map data bitstream. Then, the bitstream is sent to a traditional video decoder after passing through a de-repacking module and a de-quantization module, to be subject to decoding, so as to recover originally-input feature map data.

At present, the repacking module/the de-repacking module may have multiple selectable modes, such as a superposition mode with a specified order of feature maps, a tiling mode with a default order or specified order of feature maps, or the like. However, these existing modes still have some defects. For example, in the tiling mode, data of multiple channels for a feature are sequentially tiled in an image according to a single list, and the data of multiple channels are closely adjacent to each other, which result in that when the tiled image is coded by using existing encoding and decoding methods, coding efficiency may be reduced since there is a discontinuity between data of different channels and a large number of encoding bits, leading to a poor compression effect of feature map data.

SUMMARY

In a first aspect, embodiments of the disclosure provide an encoding method, which is applied to an encoder and includes the following. Multiple feature maps corresponding to multiple channels are determined. The multiple feature maps are reordered by relevance and spatially spliced to obtain one or more quasi-spatial video sequences and corresponding feature map splicing orders. For each quasi-spatial video sequence, a block-coding candidate motion information list for a current block is constructed according to the feature map splicing order corresponding to the quasi-spatial video sequence. The current block is encoded based on the block-coding candidate motion information list to generate a bitstream.

In a second aspect, embodiments of the disclosure provide a decoding method, which is applied to a decoder and includes the following. An encoding result of a current block, a target index for the current block, and a block-coding enable flag for the current block are obtained by parsing a bitstream. A feature map splicing order is obtained. When the block-coding enable flag is valid, target block-coding motion information corresponding to the target index is determined based on the feature map splicing order and pixel position information of the current block. The encoding result of the current block is decoded based on the target block-coding motion information.

In a third aspect, embodiments of the disclosure provide a decoder. The decoder includes a processor and a memory storing a computer program which, when executed by the processor, causes the processor to perform the method of the second aspect.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

DETAILED DESCRIPTION

In order to understand characteristics and technical contents of embodiments of the disclosure more thoroughly, the embodiments of the disclosure will be described in detail below with reference to the drawings, which are used for reference and illustration only and are not intended to limit the embodiments of the disclosure.

In a video picture, a first colour component, a second colour component, and a third colour component are generally used to characterize a coding block (CB). The three colour components are a luminance (luma) component, a blue chrominance (chroma) component, and a red chroma component. Specifically, the luma component is usually represented by a symbol Y, the blue chroma component is usually represented by a symbol Cb or U, and the red chroma component is usually represented by a symbol Cr or V. In this way, the video picture may be represented in a YCbCr format or in a YUV format.

Related technical solutions of current feature map coding processes are described below.

Figure 1:
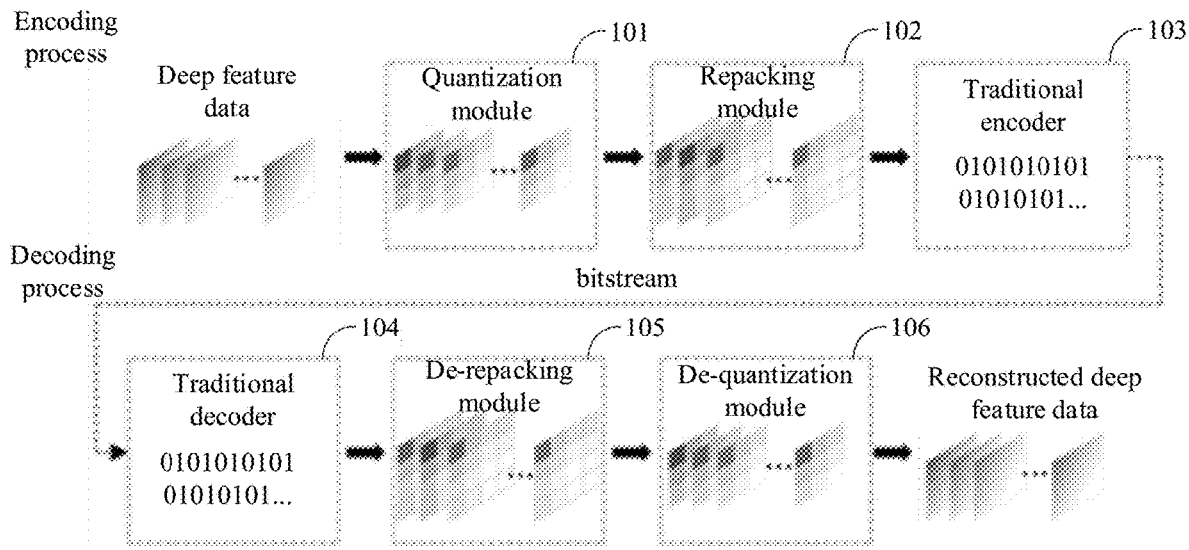
FIG. 1 is schematic structural diagram of a feature map coding framework according to the related art.

With reference to FIG. 1, FIG. 1 a schematic structural diagram of a feature map coding framework according to the related art. As illustrated in FIG. 1, the feature map coding framework may include a quantization (Pre-Quantization) module 101, a repacking (Repack) module 102, a traditional video encoder (Video Encoder) 103, a traditional video decoder (Video Decoder) 104, a de-repacking (DeRepack) module 105, and a de-quantization (Pre-DeQuantization) module 106.

In the encoding process, input deep feature data (Deep Features) is subject to quantization performed by the quantization module 101, and then is subject to format conversion performed by the repacking module 102. For example, originally-input Deep Features are converted from a three-dimensional (3D) array into a YUV format that meets input requirements of the traditional video encoder 103, and then are encoded by the traditional video encoder 103, where the generated bitstream (for example, 01010101010101 0101 . . . ) is included in a bitstream of feature map data and transmitted to the traditional video decoder 104. In the decoding process, the bitstream is parsed by the traditional video decoder 104 firstly, and then feature map data in the YUV format is converted by the de-repacking module 105 into feature map data in an array form, and then is subject to de-quantization performed by the de-quantization module 106, so that reconstructed deep feature data (Reconstructed Deep Features) may be recovered.

That is, the feature map coding framework mainly includes three parts, i.e., the quantization module 101/the de-quantization module 106, the repacking module 102/the de-repacking module 105, and the traditional video encoder 103/the traditional video decoder 104. Specific contents of the modules are as follows.

For the quantization module 101/the de-quantization module 106, it needs to quantize originally-input feature map data when the feature map data is of a floating-point type, so that the feature map data is converted into data of an integer type meeting input requirements of the traditional video encoder.

For the repacking module 102/the de-repacking module 105, the repacking module 102 converts the originally-input feature map data from the 3D array into the YUV format meeting input requirements of the traditional video encoder. Furthermore, the combination manner of the feature map data is changed, which can improve a coding efficiency of the traditional video encoder on the feature map data. Here, the repacking module 102/the de-repacking module 105 may have multiple selectable modes, such as a superposition mode with a specified order of feature maps, a tiling mode with a default order or specified order of feature maps, or the like.

For the superposition mode with a specified order of feature maps, each channel of the feature map corresponds to a picture in input data of the traditional video encoder. The height and width of the feature map are extended to the height and width meeting input requirements of the traditional video encoder respectively. A channel order of the feature map data is recorded in repack order list, and contents in the repack order list may be default to be a default order array (for example, [0, 1, 2, 3, . . . ]).

For the tiling mode with a default order or specified order of feature maps, multiple channels of the feature map are tiled and spliced to a two-dimensional (2D) array, to be used as a picture in input data of the traditional video encoder. The height and width of the spliced array are extended to the height and width meeting input requirements of the traditional video encoder respectively. A splicing order is a channel order of original feature map data, sequential arrangement is preferred in the width direction and then the high direction of the array, and after a current picture is fully tiled, a next picture is created to continue to be tiled, until all the channels of the feature map are tiled. A channel order of the feature map data is recorded in repack order list, and contents thereof may be default to be a default order array (for example, [0, 1, 2, 3, . . . ]).

Furthermore, for the traditional video encoder 103/the traditional video decoder 104, feature map array data after quantization and repacking is sent into the traditional video encoder 103 in the YUV format, to be subject to compression encoding, and a bitstream generated by the traditional video encoder 103 is included in a feature map data bitstream. Exemplarily, for a video encoder of H.265/high efficiency video coding (HEVC), the feature map array data will be input in a 4:0:0 format, and for a video encoder of a 3rd Audio Video coding Standard (AVS3), the feature map array data will be input in a 4:2:0 format.

However, these existing modes still have some defects. In the superposition mode, only a single list is applied to describe an order of feature channels. Since the feature channels are not arranged in an optimal order according to correlation between the feature channels, and reference relationships between the feature channels in the video coder are not guided and designed, a coding efficiency of superimposed feature channels is not high due to incomplete consideration. Furthermore, in the tiling mode, data of multiple channels for a feature are sequentially tiled in a picture according to a single list, and the data of multiple channels are closely adjacent to one another, which result in that when the tiled picture is encoded by using existing coding methods, the data of multiple channels will be partitioned into the same coding unit during block partitioning. In this case, since there is a discontinuity between data of different channels, correlation between data of different channels in the same coding unit is weak, so that efficiencies of the existing coding methods cannot be effectively achieved, and a compression effect of the feature data is not good enough.

Based on this, the embodiments of the disclosure provide an encoding method. A basic idea of the encoding method is: determining multiple feature maps corresponding to multiple channels; reordering the multiple feature maps by relevance and spatially splicing the multiple feature maps to obtain one or more quasi-spatial video sequences and corresponding feature map splicing orders; constructing, for each quasi-spatial video sequence, a block-coding candidate motion information list for a current block according to the feature map splicing order corresponding to the quasi-spatial video sequence; and encoding the current block based on the block-coding candidate motion information list to generate a bitstream. The embodiments of the disclosure further provide a decoding method. A basic idea of the decoding method is: obtaining an encoding result of a current block, a target index for the current block, and a block-coding enable flag for the current block by parsing a bitstream; obtaining a feature map splicing order; determining target block-coding motion information corresponding to the target index based on the feature map splicing order and pixel position information of the current block when the block-coding enable flag is valid; and decoding the encoding result of the current block based on the target block-coding motion information. In this way, multiple feature maps are reordered and spatially spliced, which can fully utilize correlation information between feature maps, and block coding may be further performed on the current block based on the block-coding candidate motion information list, which can reduce the number of encoding bits. As such, not only reference relationship between feature maps can be optimized, but also the compression efficiency of feature map data can be improved, thus reducing the transmitted bitstream and improving coding efficiency of feature map data.

The embodiments of the disclosure will be described in detail below with reference to the drawings.

It should be noted that before the detailed description, terms "first", "second", "third", or the like mentioned throughout the description are merely intended to distinguish different features, and not intended to limit priorities, sequences, size relationships, or the like.

In an embodiment of the disclosure, an encoding method provided in the embodiments of the disclosure is applied to a video encoding device, i.e., an encoder. Functions implemented by the method may be achieved by a first processor in the encoder calling a computer program, where the computer program may be stored in a first memory. It can be seen that the encoder includes at least the first processor and the first memory.

Figure 2:
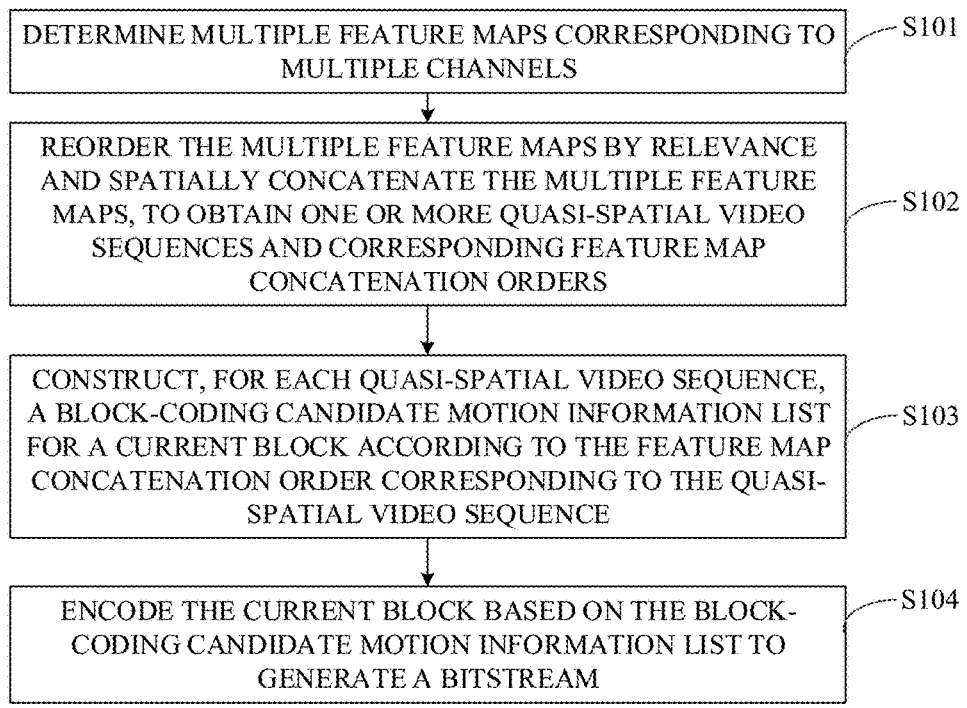
FIG. 2 is a schematic flowchart of an encoding method according to embodiments of the present disclosure.

Referring to FIG. 2, FIG. 2 illustrates a schematic flowchart of an encoding method according to embodiments of the present disclosure. As illustrated in FIG. 2, the method may include the following operations.

At block S101, multiple feature maps corresponding to multiple channels are determined.

In the embodiments of the present disclosure, the encoding method is applicable to an encoder of an H.265/HEVC standard, or applicable to an encoder of an H.266/Versatile Video Coding (VVC) standard, or even applicable to encoders of other standards, such as an encoder of an AVS standard, an encoder of an Essential Video Coding (EVC) standard, or the like, which are not specifically limited in the embodiments of the disclosure.

The encoding method provided in embodiments of the present disclosure may be applied in scenarios where machine learning with an artificial intelligence (AI) model is used for prediction or identification, where the AI model may be a preset neural network model, etc., which is not limited in the embodiments of the disclosure.

In the embodiments of the present disclosure, the multiple feature maps corresponding to the multiple channels are multiple feature maps obtained after preprocessing of feature data of the multiple channels acquired at any one of intermediate layers of the AI model.

As an example, the encoding method is applied to a scenario with the preset neural network model. In some embodiments of the present disclosure, the encoder may obtain a picture to-be-processed, and then obtain multiple feature maps by performing feature extraction and preprocessing on the picture to-be-processed using the preset neural network model, where the multiple feature maps include feature data of multiple channels.

Here, the preset neural network model is usually a convolutional neural network (CNN) model. CNN is a kind of feed forward neural network including convolution computation and having a deep structure, and is one of representative algorithms for deep learning. CNN has a representation learning capability and may perform shift-invariant classification on input information according to a hierarchical structure thereof, and thus is also referred to as a "shift-invariant artificial neural network (SIANN)". The neural network has been developed to a deep learning phase. Deep learning is a branch of machine learning, and is an algorithm attempting to perform high-level abstraction on data by using multiple processing layers including complex structures or composed of multiple non-linear transformations, and a powerful expression capability thereof makes it have a good effect on performance of video and image processing.

That is, in the embodiment of the disclosure, the picture to-be-processed is input to the model, and feature data extracted from a network intermediate layer after the picture to-be-processed image passes through the preset neural network model is determined as the input feature map data. The multiple feature maps of multiple channels may be obtained after preprocessing and form conversion is performed on the input feature map data. It should be noted that the picture to-be-processed mentioned here may refer to an image, or may refer to a video picture, which are not specifically limited in the embodiments of the disclosure.

In embodiments of the disclosure, the input feature map data may be in a tensor form or an array form. For a picture with a width W1 and a height H1, the size of corresponding feature map data may be represented in a tensor shape (C, W, H). Here C is the number of channels, W is the width of a feature tensor, H is the height of the feature tensor, and W and H mentioned here are feature tensor sizes.

In some embodiments of the present disclosure, when the input feature map data is in the tensor form, the encoder may perform a form conversion on each of the feature data of the multiple channels in the input feature map data to obtain multiple first feature data, where each channel corresponds to one first feature data and the first feature data is in the array form. The multiple first feature data are determined as the input feature map data.

That is, if the input feature map data is in the tensor form, then it is necessary to perform form conversion on the input feature map data to convert the input feature map data into the array form to obtain the multiple first feature data, where each of the first feature data is in the array form. In this case, the multiple first feature data may be determined as the input feature map data.

In some embodiments of the present disclosure, the preprocessing may include quantization and form conversion. In this case, the encoder obtains the multiple first feature data by performing form conversion on the feature data of multiple channels in the input feature map data, where each channel corresponds to one first feature data and the first feature data is in the array form. Then the encoder performs quantization and form conversion on each of the multiple first feature data to obtain multiple feature maps.

In some embodiments of the present disclosure, the encoder may quantize the multiple first feature data separately to obtain multiple second feature data, and perform form conversion on the multiple second feature data separately to obtain multiple feature maps.

That is, for the multiple first feature data, the first feature data corresponding to each channel may be quantized, and the quantized feature data is determined as the second feature data. Here, the second feature data is also in the array form. Form conversion is performed on the second feature data corresponding to each channel, so that the second feature data is converted from the array form to a feature map form, so as to obtain a feature map corresponding to each channel, thus obtaining multiple feature maps corresponding to the multiple channels.

Further, the encoder may obtain the multiple second feature data by quantizing the multiple first feature data separately as follows. Based on the multiple first feature data, a minimum value and a maximum value are selected from the first feature data corresponding to each channel, and according to the first feature data corresponding to each channel as well as the minimum value and the maximum value, second feature data corresponding to each channel is determined by using a first calculation model, so as to obtain the multiple second feature data.

It should be noted that to quantize feature data, in a specific example, the minimum value (represented by $x_{min}$) and the maximum value (represented by $x_{max}$) may be queried. Here, $x_{min}$ refers to a minimum value in the first feature data of a single channel, and $x_{max}$ refers to a maximum value in the first feature data of the single channel. In this case, a quantization formula (i.e., the first calculation model) is the following formula (1):

$$\hat{y}_{ij} = \text{int}\left[\frac{x_{ij} - x_{min}}{x_{max} - x_{min}} * (2^n - 1)\right] \quad (1)$$

Here, $x_{ij}$ represents data at an i-th row and j-th column in an array (H, W) corresponding to the unquantized first feature data, $x_{min}$ represents a minimum value in the array (H, W) corresponding to the unquantized first feature data, $x_{max}$ represents a maximum value in the array (H, W) corresponding to the unquantized first feature data, $\hat{y}_{ij}$ represents data at the i-th row and the j-th column in an array (H, W) corresponding to the quantized second feature data, n represents the number of bits, and int[ ] represents an integralization function.

In another specific example, a logarithmic fixed-point formula may be used. Quantization functions to shape floating-point data into fixed-point data. In this case, the quantization formula may be replaced by the logarithmic fixed-point formula as the following formula (2).

$$\hat{y}_{ij} = \text{int}\left[\frac{\log_2(1 + x_{ij})}{\max\_num} \times \left(2^{BitDepth} - 1\right)\right] \quad (2)$$

Here, $x_{ij}$ represents data at an i-th row and j-th column in an array (H, W) corresponding to the unquantized first feature data, $\hat{y}_{ij}$ represents data at an i-th row and j-th column in an array (H, W) corresponding to the quantized second feature data, that is, $x_{ij}$ and $\hat{y}_{ij}$ represent original data and fixed-point data respectively, max_num represents a maximum value in the feature data $\log_2(1+x_{ij})$ after logarithmic conversion, BitDepth represents the number of fixed-point bits, $\log_2(\bullet)$ operation returns a logarithmic value of an input to the base 2, and int[ ] operation returns an integer value closest to an input value.

Furthermore, for $x_{min}$ and $x_{max}$, the minimum value ($x_{min}$) and the maximum value ($x_{max}$) corresponding to each channel also need to be transmitted to a decoder for use. Therefore, in some embodiments, the method may further include that the encoder signals the minimum value and the maximum value corresponding to each channel into the bitstream.

In some embodiments of the present disclosure, based on the multiple second feature data, the encoder converts the second feature data corresponding to each channel from the array form to the feature map form to determine a feature map corresponding to each channel, so as to obtain the multiple feature maps.

It should be noted that, once obtaining a quantized array of each channel (i.e., the second feature data), the encoder may convert the quantized array from the array form to the feature map form to obtain the feature map corresponding to each channel, thus obtaining multiple feature maps corresponding to the multiple channels.

It should also be noted that in the embodiments of the present disclosure, quantization and form conversion are not necessary processing operations, but are optional. In embodiments of the present disclosure, if the input feature map data is already integer data, then quantization may not be required, and only related processing such as padding and form conversion may be required.

In the embodiments of the present disclosure, before the form conversion, if the array size of the first feature data already meets input size requirements of the video encoder, then padding may be omitted. If the array size of the first feature data does not meet the input size requirements of the video encoder, then padding is first performed before the form conversion. In this case, quantization may be performed before padding, or padding may be performed before quantization. The embodiments of the present disclosure are described taking "first quantization and then padding" as an example, but there is no specific limitation on the order of execution.

At block S102, the multiple feature maps are reordered by relevance and spliced spatially to obtain one or more quasi-spatial video sequences and corresponding feature map splicing orders.

In embodiments of the present disclosure, after the encoder obtains the multiple feature maps, the encoder sets an initial order of the multiple feature maps to be an order of the channel numbers.

In this case, the correlation between the feature maps is not considered in the initial order, and thus reordering needs to be performed on the multiple feature maps. In some embodiments of the present disclosure, the encoder reorders the multiple feature maps by relevance and spatially splices the multiple feature maps to obtain one or more quasi-spatial video sequences and corresponding feature map splicing orders as follows. The multiple feature maps corresponding to the multiple channels are clustered to determine a target feature map for at least one cluster, where the target feature map is in one-to-one correspondence with the at least one cluster. The multiple feature maps are reordered according to the target feature map for each cluster, and for each cluster, a feature sequence and a feature map splicing order for the feature sequence are determined. For each cluster, feature maps in the feature sequence are spatially spliced according to the feature map splicing order for the feature sequence to obtain 2D arrangement position information of feature maps in the feature sequence and a quasi-spatial sequence corresponding to the cluster, thus obtaining one or more quasi-spatial sequences. Form conversion is performed on the one or more quasi-spatial sequences to obtain the one or more quasi-spatial video sequences.

In embodiments of the present disclosure, the encoder may cluster the multiple feature maps of the multiple channels into at least one cluster, determine a centroid of each of the at least one cluster to obtain at least one centroid, and determine, based on the at least one centroid, a target feature map for the at least one cluster from the multiple feature maps, where the target feature map represents a feature map in the multiple feature maps that has a minimum distance to a centroid of the at least one centroid.

That is, once the encoder obtains the multiple feature maps, the encoder may cluster these multiple feature maps to obtain at least one cluster and determine the centroid of each cluster, and then determine the feature map that has the closest distance to the centroid of the at least one centroid as the centroid feature map, i.e., the target feature map in the embodiments of the present disclosure.

In embodiments of the present disclosure, the encoder may obtain one or more quasi-spatial sequences by clustering the feature maps of different channels in the multiple feature maps. Each quasi-spatial sequence may be obtained by clustering and splicing the feature maps of different channels. Each quasi-spatial sequence may have a different number of feature maps of the different channels. All feature maps of the different channels in all of the one or more quasi-spatial sequences form the multiple feature maps described above.

Exemplarily, assume that 5 feature maps of 5 channels are: feature map A corresponding to channel A, feature map B corresponding to channel B, feature map C corresponding to channel C, feature map D corresponding to channel D, and feature map E corresponding to channel E. The encoder clusters and splices the 5 feature maps to obtain 2 quasi-spatial sequences, where quasi-spatial sequence 1 is obtained by clustering and splicing of channel A and channel C and is formed by feature map A and feature map C; and quasi-spatial sequence 2 is obtained by clustering and splicing of channel B, channel D, and channel E and is formed by feature map B, feature map D, and feature map E.

In embodiments of the present disclosure, a feature sequence for each cluster includes S feature maps corresponding to different channels, where S is an integer greater than 1.

In some embodiments of the present disclosure, for each cluster, the encoder spatially splices the feature maps in the feature sequence according to the feature map splicing order for the feature sequence to obtain the quasi-spatial sequence corresponding to the cluster, so as to obtain the one or more quasi-spatial sequences as follows. The encoder may determine a preset arrangement number of feature maps in each row or each column according to the number of the S feature maps; splice, for each cluster, the S feature maps in the feature sequence in a preset arrangement manner based on the preset arrangement number according to the feature map splicing order for the feature sequence, to obtain, for each feature map in the feature sequence, 2D arrangement position information in an arrangement of M rows and N columns, and obtain a spliced quasi-spatial sequence corresponding to the cluster, where M and N each are an integer greater than 1; and obtain the one or more quasi-spatial sequences when splicing has been performed for all clusters.

In embodiments of the present disclosure, the preset arrangement manner may include a row-scan manner, a column-scan manner, or other scan manners, which are not limited in embodiments of the present disclosure.

Figure 3:
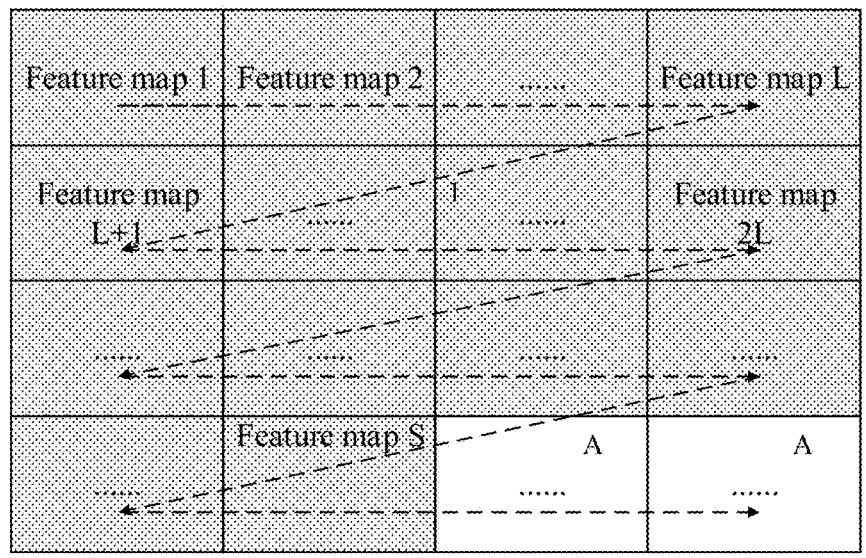
FIG. 3 is a schematic diagram illustrating exemplary feature map splicing for a quasi-spatial video sequence according to embodiments of the present disclosure.

In embodiments of the present disclosure, the preset arrangement manner is illustrated taking the row-scan manner as an example. As illustrated in FIG. 3, S feature maps corresponding to different channels include: feature map 1, feature map 2, feature map 3, . . . , feature map L, feature map L+1, feature map 2L, . . . , and feature map S. The encoder arranges the feature maps of multiple channels sequentially in the row-scan manner (1 as indicated by the dashed arrow) according to the feature map splicing order. The encoder determines the number of feature maps to be arranged per row, i.e., the preset arrangement number, based on the number S of feature maps. For example, the number of feature maps to be arranged per row is set to L. After the S feature maps are sequentially arranged and spliced in the row-scan manner in accordance with the feature map splicing order, a quasi-spatial sequence of M rows and N columns (3 rows and 4 columns) illustrated in FIG. 3 is obtained. Then one or more quasi-spatial sequences are converted in form to obtain one or more quasi-spatial video sequences in the video space are obtained. In addition, the encoder may also record, for each feature map in the feature sequence for each cluster, 2D arrangement position information in the arrangement of M rows and N columns. The 2D arrangement position information is the position information of each of the S feature maps in the M rows and N columns of the quasi-spatial sequence.

Exemplarily, in embodiments of the present disclosure, the encoder determines the preset arrangement number according to the following formula (3):

$$S=\mathrm{round}(\mathrm{sqrt}(L)) \qquad (3)$$

where sqrt(L) returns a square root of L, and round(sqrt(L)) rounds sqrt(L).

In some embodiments of the present disclosure, when the number of feature maps in row M is less than the preset arrangement number, the row M is padded with feature maps until the preset arrangement number is reached.

Exemplarily, as illustrated in FIG. 3, the encoder pads region A at row 3, columns 3 and 4 to obtain a quasi-spatial sequence of 3 rows and 4 columns. For example, the padding values may be 0.

It should be noted that the splicing order in the embodiments of the present disclosure is in the row-scan manner, and the scan or splicing manner is not limited in the embodiments of the present disclosure.

In some embodiments of the present disclosure, the encoder reorders the multiple feature maps according to the target feature map for each cluster and determines, for each cluster, a feature sequence and a feature map splicing order for the feature sequence as follows. The target feature map for each cluster is set to be a 0-th element in the feature sequence for the cluster, among the feature sequence for the at least one cluster. When the (i+1)-th set of remaining feature maps is non-empty, for each feature map in the (i+1)-th set of remaining feature maps, a distance between the feature map and an i-th feature map in each feature sequence is calculated, and a feature map for at least one cluster is determined according to the multiple calculated distances and is set as an (i+1)-th element in the feature sequence for the corresponding cluster, where the (i+1)-th set of remaining feature maps includes remaining feature maps of the multiple feature maps other than feature maps that have been set at the preceding i positions of the feature sequence for each of the at least one cluster, and i is an integer greater than or equal to 0. Then i=i+1, until the (i+H)-th set of remaining feature maps is empty, so that the feature sequence for the at least one cluster is obtained, as well as the feature map splicing order for the feature sequence for each cluster, where H is an integer greater than 1.

It is to be noted that when i=0, the encoder may determine a first set of remaining feature maps, where the first set of remaining feature maps includes remaining feature maps other than the target feature map(s). Then the encoder may calculate a distance between each feature map in the first set of remaining feature maps and the target feature map, determine at least one feature map according to the multiple distances calculated, and set the determined at least one feature map as the 1st element in each of the at least one quasi-spatial sequence correspondingly.

When i=1, the encoder determines a second set of remaining feature maps, where the second set of remaining feature maps includes remaining feature maps other than the target feature map and the 1st feature map in each of the at least one quasi-spatial sequence. Then the encoder calculates a distance between each feature map in the second set of remaining feature maps and the 1st feature map in each of the at least one quasi-spatial sequence, determine at least one feature map according to the multiple distances calculated, and set the determined at least one feature map as the 2nd element in each of the at least one quasi-spatial sequence correspondingly.

Similarly, i=i+1, and the above operations are repeated until the (i+1)-th set of remaining feature maps is empty.

It is noted that the number of feature maps in each of the at least one quasi-spatial sequence may or may not be the same, which is not limited in the disclosure.

Figure 4:
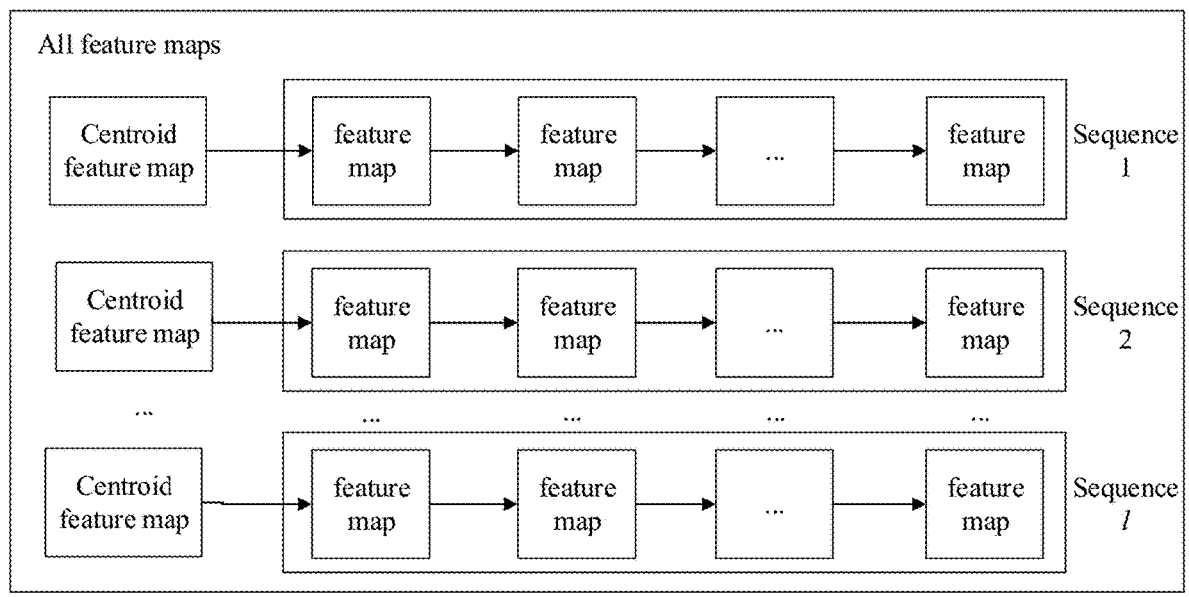
FIG. 4 is a schematic structural diagram illustrating an exemplary reordering result representation according to embodiments of the present disclosure.

Exemplarily, as illustrated in FIG. 4, the target feature maps are centroid feature maps. The at least one cluster includes l clusters, thus there are l centroid feature maps and finally l feature sequences (i.e., feature sequences for the at least one cluster) are obtained. Here, these l feature sequences correspond to different centroid feature maps. That is, each centroid feature maps is set at the 0-th position in corresponding one of these l feature sequences. Assuming that there are a total of C feature maps (corresponding to the multiple feature maps), then a distance from each of the remaining C−1 feature maps to each centroid feature map is calculated, and l feature maps each of which is closest to a respective centroid feature map are selected and each arranged at the 1st position in the feature sequence for corresponding cluster, after the centroid feature map. Then a distance from each of the remaining C-l-l feature maps to the 1st feature map of the feature sequence for each cluster is calculated, and l closest feature maps are selected and each arranged at the 2nd position in the feature sequence for corresponding cluster. The previous operation is repeated until all of the C feature maps have been reordered (the number of feature maps in each of these l feature sequences may be different). The obtained reordering result is illustrated in FIG. 3, and the feature map splicing order in the feature sequence for each cluster is obtained.

In embodiments of the present disclosure, the encoder may also select at least one distance from the calculated multiple distances according to a minimum value selection strategy, and determine at least one feature map based on the at least one selected distance.

That is, for i=0, at least one feature map with the closest distance to the target feature map is selected to be the 1st element of each quasi-spatial sequence; for i=1, at least one feature map with the closest distance to the 1st feature map in each quasi-spatial sequence is selected to be the 2nd element of each quasi-spatial sequence; and then for i=i+1, the above operation is repeated until the (i+1)-th set of remaining feature maps is empty.

In this case, since the at least one quasi-spatial sequence is in the feature map form, form conversion needs to be performed to convert from the feature map form to the YUV form, in order to obtain a quasi-spatial video sequence. Here, the YUV form means describing using the YUV format, so the quasi-spatial video sequence may also be referred to as a YUV sequence.

In embodiments of the present disclosure, by reordering the multiple feature maps, the encoder may also obtain reordering information corresponding to the quasi-spatial sequence, i.e., record channel numbers corresponding to the feature maps of each quasi-spatial sequence after the reordering, so as to transmit to the decoder for post-processing recovery.

In some embodiments of the present disclosure, the reordering information is channel numbers of the multiple channels corresponding to the feature maps corresponding to the 2D arrangement position information.

In some embodiments of the present disclosure, the reordering information may include at least one list, i.e., the reordering information may be stored in the list form. The encoder sets the at least one list and obtains the reordering information according to the at least one list. Each list is used to store channel numbers corresponding to positions of feature maps in each of the at least one quasi-spatial sequence, i.e., the 2D arrangement position information and the channel numbers of the multiple channels corresponding to the feature maps.

Exemplarily, in embodiments of the present disclosure, the reordering information may be represented in formula (4):

$$\text{List}^l[i,j]=X \tag{4}$$

Here, X represents a channel number, before reordering, corresponding to a feature map arranged in the i-th row and j-th column of a reordered quasi-spatial sequence for the l-th cluster (i.e., the l-th sequence), $\text{List}^l[\ ]$ represents a list of reordering information for the l-th sequence, and [i, j] represents 2D arrangement position information.

Each of the at least one list records not only channel numbers corresponding to at least two feature maps, but also the numbers (indexes) of the at least two feature maps in the sequence. In addition, feature maps in the same quasi-spatial sequence may be used as reference for one another, while feature maps in different quasi-spatial sequences may not be used as reference for one another. In this way, reordering information of feature maps with similar contents can be described in the same quasi-spatial sequence, and reordering information of feature maps with significantly different contents can be described in different quasi-spatial sequences, thereby ensuring reference between similar feature maps and avoiding reference between significantly different feature maps. As such, during coding, the feature maps can be referenced to one another to facilitate the prediction, which can improve coding efficiency.

At block S103, for each quasi-spatial video sequence, a block-coding candidate motion information list for a current block is constructed according to the feature map splicing order corresponding to the quasi-spatial video sequence.

In embodiments of the present disclosure, the encoder may determine at least one reference block of the current block according to the feature map splicing order, then determine at least one motion information between the at least one reference block and the current block, and finally construct the block-coding candidate motion information list.

In some embodiments of the present disclosure, the encoder may also determine, according to the feature map splicing order, at least one motion information between a reference block in at least one first feature map and the current block in a second feature map in each quasi-spatial video sequence, and construct the block-coding candidate motion information list according to the at least one motion information.

The at least one first feature map is a feature map that has been encoded prior to encoding the second feature map. A first position where the reference block is located in the at least one first feature map is the same as a second position where the current block is located in the second feature map.

It is noted that in embodiments of the present disclosure, for a quasi-spatial sequence, the reference block is a block that has been encoded in a feature map preceding the feature map where the current block is located.

In some embodiments of the present disclosure, the encoder determines at least one 2D arrangement position information of at least one reference block in the at least one first feature map and current 2D arrangement position information of the current block according to the feature map splicing order, and determines the at least one motion information according to the at least one 2D arrangement position information, the current 2D arrangement position information, and a preset size of an arrangement space for the feature map.

It should be noted that in the process of splicing the multiple feature maps, the encoder can obtain the 2D arrangement position information of the feature maps. Therefore, for each block in a feature map, the position information in M rows and N columns is consistent with the 2D arrangement position information of the feature map.

In embodiments of the present disclosure, the current 2D arrangement position information of the current block is the 2D arrangement position information of the second feature map, and the at least one 2D arrangement position information of the at least one reference block is the 2D arrangement position information of the at least one feature map where the at least one reference block is located.

Exemplarily, as illustrated in FIG. 3, feature map 2 is located in row 1 and column 2, and the 2D arrangement position information [i, j] of feature map 2 is (1, 2), where i is the row number and j is the column number.

In some embodiments of the present disclosure, the preset size of the arrangement space for the feature map includes a width of the arrangement space and a height of the arrangement space.

The encoder obtains at least one abscissa multiple by determining a difference in abscissa between each of the at least one 2D arrangement position information and the current 2D arrangement position information, obtains at least one ordinate multiple by determining a difference in ordinate between each of the at least one 2D arrangement position information and the current 2D arrangement position information, and obtains the at least one motion information, by determining an abscissa component of the at least one motion information according to the at least one ordinate multiple and the width of the arrangement space and determining an ordinate component of the at least one motion information according to the at least one abscissa multiple and the height of the arrangement space.

In embodiments of the present disclosure, the feature maps are spliced according to the preset size of the arrangement space for the feature map, so that a difference in abscissa component between adjacent feature maps in the same row is the width of the arrangement space, and a difference in the ordinate components between adjacent feature maps in the same column is the height of the arrangement space.

It is to be noted that when determining each reference block of the current block in at least one first feature map, the motion information between each reference block and the current block may be determined according to an integer multiple of the width of the arrangement space and/or the height of the arrangement space. In addition, by using the displacement in terms of the multiple of the width of the arrangement space and/or the height of the arrangement space, the position of the determined reference block in the first feature map is the same as the position of the current block in the second feature map. In this way, the determined reference block is located at the closest and most relevant position to the current block, so that the constructed block-coding candidate motion information list will be the most relevant to the current block. Therefore, using such block-coding candidate motion information list to encode the current block can have a better and accurate coding effect.

In some embodiments of the present disclosure, the preset size of the arrangement space for the feature map is a size of a feature map, or the preset size of the arrangement space for the feature map is a sum of the size of the feature map and arrangement gap position information.

It should be noted that the feature maps may be tightly spliced without gap, in which case the preset size of the arrangement space for the feature map is the size of the feature map. Optionally, the feature maps may be arranged in accordance with an arrangement gap, in which case the preset size of the arrangement space for the feature map is the sum of the size of the feature map and the arrangement gap position information.

Exemplarily, the 2D arrangement position information of the reference block is (m, n), the current 2D arrangement position information of the current block is (i, j), where i is the row number and j is the column number, the width of the arrangement space is A, and the height of the arrangement space is B. Then the motion information, i.e., a motion vector, between the reference block and the current block is as illustrated in formula (5):

$$X=(n-j)\times A \quad Y=(m-i)\times B \quad (5)$$

where n−j is an ordinate multiple, and m−i is an abscissa multiple.

The encoder determines the abscissa component X of motion information based on the ordinate multiple n−j and the width A of the arrangement space, and determines the ordinate component Y of the motion information based on the abscissa multiple m−i and the height B of the arrangement space.

The following describes an example in which the preset size of the arrangement space for the feature map is the size of the feature map. The width of the feature map is W and the height of the feature map is H.

Figure 5:
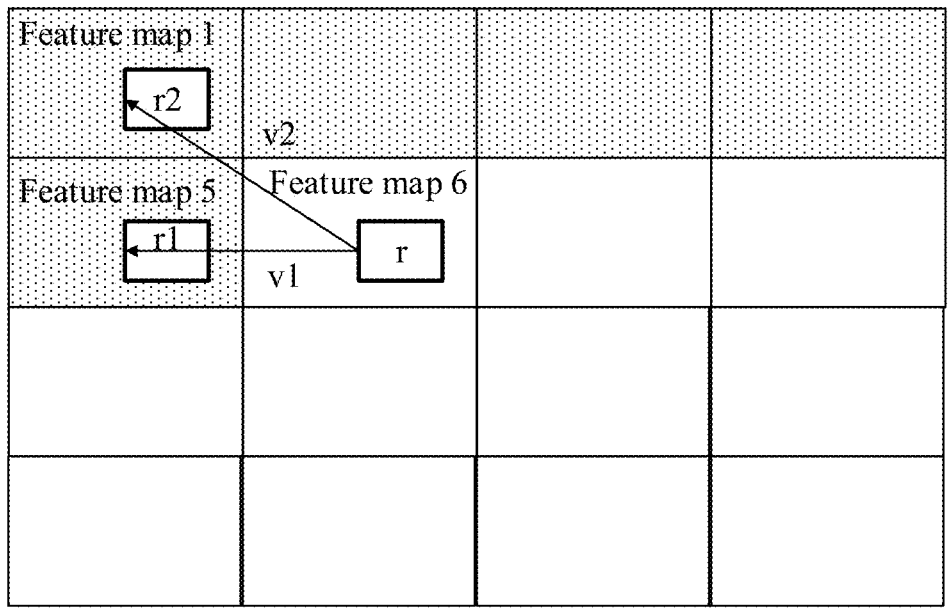
FIG. 5 is a schematic structural diagram illustrating exemplary calculation of motion information according to embodiments of the present disclosure.

Exemplarily, as illustrated in FIG. 5, the current block is represented by r and the reference blocks are represented by r1 and r2, where r1 is (1, 1), r2 is (1, 2), and r is (2, 1). Then the motion vector V1 is (0, −H) and V2 is (W, −H).

In some embodiments of the present disclosure, when constructing the block-coding candidate motion information list according to the at least one motion information, the encoder may further arrange the at least one motion information corresponding to the at least one first feature map according to the feature map splicing order, and determine a mapping relationship between at least one index of block-coding candidate motion information and the at least one motion information to obtain the block-coding candidate motion information list.

The at least one index of block-coding candidate motion information is an index of motion information corresponding to the at least one first feature map in a descending order of the feature map splicing order. That is, a construction order of the motion vector list is the reverse order of the feature map splicing order.

It is to be noted that in embodiments of the present disclosure, while the at least one motion information is determined, the encoder simultaneously establishes indexes corresponding to the motion information, i.e., the at least one index of block-coding candidate motion information. The at least one motion information corresponding to the at least one index of block-coding candidate motion information may be the motion information of the first feature map with an index in a descending order of the feature map splicing order.

In embodiments of the present disclosure, the encoder may determine the index according to an ascending order of distance (from the closest to the farthest) in the splicing order to the feature map where the current block is located. Motion information of a first feature map closest to the feature map where the current block is located is placed at the first position in the block-coding candidate motion information list, and the index of the motion information is the minimum. The closer in the splicing order from a first feature map to the feature map where the current block is located, the smaller the index of the motion information corresponding to that first feature map. In this way, the motion information of the feature map that is most relevant to the current block can be encoded with the minimum index and signalled into the bitstream, which can reduce the transmission bitstream.

Exemplarily, the current block belongs to feature map L. Then motion information are signalled into the block-coding candidate motion information list in order of feature map L−1, feature map L−2, feature map L−3, . . . , and feature map 1.

Exemplarily, when the feature map splicing manner is row scan, the encoder constructs an intra block copy (IBC) special candidate motion vector list for the current block according to the feature map splicing order. As illustrated in FIG. 3, if the length of the candidate motion vector list is 3 and the current block is located in feature map L+1, the motion vector list is constructed in the order of corresponding block positions of feature map L, feature map L−1, feature map L−2, i.e., the motion vectors are (W*(L−2), +H), (W*(L−3), −H), (W*(L−4), −H).

In embodiments of the present disclosure, the encoder may determine the index according to a descending order of distance (from the farthest to the closest) in the splicing order to the feature map where the current block is located. Motion information of a first feature map farthest to the feature map where the current block is located is placed at the first position in the block-coding candidate motion information list, and the index of the motion information is the minimum. The farther in the splicing order from a first feature map to the feature map where the current block is located, the smaller the index of the motion information corresponding to that first feature map. That is, a construction order of the motion vector list is the feature map splicing order.

At block S104, the current block is encoded based on the block-coding candidate motion information list to generate a bitstream.

In embodiments of the present disclosure, after obtaining the block-coding candidate motion information list constructed from the motion information corresponding to the at least one reference block, the encoder may determine the target block-coding motion information finally used based on the at least one motion information, and then encode the current block using the target block encoding motion information to obtain the encoding result.

In some embodiments of the present disclosure, the encoder traverses the at least one motion information in the block-coding candidate motion information list and calculates at least one rate-distortion cost corresponding to the at least one motion information. The encoder determines the target block-coding motion information based on the at least one rate-distortion cost, obtains the encoding result by encoding the current block with the target block-coding motion information, and signals the encoding result into the bitstream.

In some embodiments of the present disclosure, the encoder determines the target block-coding motion information based on the at least one rate-distortion cost as follows. The encoder obtains best motion information determined in other motion search method, calculates a first rate-distortion cost for the best motion information, and compares the at least one rate-distortion cost and the first rate-distortion cost and determines motion information corresponding to the minimum rate-distortion cost as the target block-coding motion information.

In some embodiments of the present disclosure, the encoder may also determine the target block-coding motion information based on the at least one rate-distortion cost as follows. The encoder determines motion information corresponding to the minimum rate-distortion cost in the at least one rate-distortion cost as the target block-coding motion information.

It is to be noted that in embodiments of the present disclosure, the encoder may encode using an IBC method, and the constructed block-coding candidate motion information list is the IBC special candidate motion vector list. Based on the candidate motion vector list, the encoder performs motion search, traverses the IBC special candidate motion vector list, calculates an encoding cost, and selects a candidate motion vector with the lowest cost as the best motion vector of the special candidate list. The encoder compares the best motion vector with best motion vectors returned by other motion search methods (e.g., integer-pixel search, etc.), calculates the encoding costs, and selects the motion vector with the best cost as the best IBC motion vector for the current block, i.e., the target block-coding motion information.

It should be noted that IBC is a tool applied in the HEVC extension on SCC to significantly improve the coding efficiency of the current block. Since the IBC mode is implemented as a block-level coding mode, block matching (BM) is performed at the encoder to find the optimal block vector (or motion vector) for each CU.

In some embodiments of the present disclosure, a valid block-coding enable flag is generated when the target block-coding motion information belongs to the at least one motion information, and an invalid block-coding enable flag is generated when the target block-coding motion information does not belong to the at least one motion information. A target index of the target block-coding motion information is obtained. The block-coding enable flag and the target index are signalled into the bitstream.

In embodiments of the present disclosure, if the best IBC motion vector (i.e., the target block-coding motion information) for the current block is from the constructed IBC special candidate motion vector list, a valid flag (i.e., block-coding enable flag) is generated to indicate that the best IBC motion vector for the current block is from the constructed IBC special candidate motion vector list, and then an index of the best IBC motion vector (i.e., the target index of the target block-coding motion information) in the list is obtained.

If the best IBC motion vector for the current block (i.e., the target block-coding motion information) is not from the constructed IBC special candidate motion vector list, an invalid flag (i.e., block-coding enable flag) is generated to indicate that the best IBC motion vector for the current block is not from the constructed IBC special candidate motion vector list, and then an index of the motion vector (i.e., the target index of the target block-coding motion information) in another motion information list constructed in other encoding mode is obtained.

It should be noted that the target index of the target block-coding motion information may be a 1-bit flag.

In embodiments of the present disclosure, during the encoding process, the encoder may further signal into the bitstream the preset size of the arrangement space for the feature map, the encoding result, the block-coding enable flag, the target index, and the preset arrangement number.

In embodiments of the present disclosure, whether the block-coding enable flag is valid or invalid may be indicated by numerical values. For example, a value "1" of the flag indicates validity, and a value "0" of the flag indicates invalidity. The numerical values indicating validity and invalidity are not limited in embodiments of the disclosure.

Exemplarily, the following flags need to be introduced to the bitstream if the encoder uses the IBC coding mode:

IBC_special (corresponding to the block-coding enable flag): indicates whether the best IBC motion vector for the current block is from the above IBC special candidate motion vector list. If IBC_special is 1, it indicates that the best IBC motion vector for the current block is from the above IBC special candidate motion vector list. If IBC_special is 0, it indicates that the best IBC motion vector for the current block is not from the above IBC special candidate motion vector list.

IBC_special_idx (corresponding to the target index): indicates the index of the best IBC motion vector for the current block in the above IBC special candidate motion vector list. If IBC_special is 1, then IBC_special_idx is encoded, in which case there is no need to transmit motion vector prediction residuals.

It should be noted that the IBC syntax structure may be as illustrated in Table 1.

TABLE 1

| | Descriptor |
|---|---|
| (current block) { | |
|   IBC_special | ue(v) |
|   If(IBC_special){ | |
|     IBC_special_idx | ue(v) |
|   } | |
| } | |

It is to be noted that after obtaining the quasi-spatial video sequence and the reordering information, the quasi-spatial video sequence and the reordering information may be encoded to generate a bitstream. Here, the quasi-spatial video sequence may be represented in a YUV form, i.e., the quasi-spatial video sequence may also be referred to as a quasi-spatial YUV sequence. The quasi-spatial video sequence may include at least one sequence, and the feature maps within each of the sequences have a reference relationship with one another. The reordering information is used to indicate the reference relationship among the feature maps in the quasi-spatial video sequence.

It can be understood that, with the IBC coding mode, the encoder may effectively utilize the spatial correlation among the ordered 2D feature maps to further improve the coding efficiency. The construction of the special IBC candidate motion vector list and the method of encoding the motion vectors can further reduce the number of bits required for encoding the motion vectors, thus improving the coding efficiency.

It is also noted that in addition to the quasi-spatial video sequence and the reordering information, the encoder needs to signal the tensor form of the input feature map data into the bitstream. In some embodiments of the present disclosure, the encoder signals the tensor form of the input feature map data into the bitstream, where the tensor form includes the number of channels and a feature tensor size, and the feature tensor size includes a height and a width of the feature tensor (i.e., the size of the feature map).

Here, the tensor form is a feature tensor shape, which is denoted by (C, W, H), where C is the number of channels, W is the width of the feature tensor, H is the height of the feature tensor. Here, W and H are the feature tensor sizes.

Further, the reordering information may also be recorded in supplemental enhancement information (SEI). The supplemental enhancement information may be SEI in VVC or HEVC, or extension data in the AVS standard. Thus, in some embodiments of the present disclosure, the encoder determines the supplemental enhancement information that is used to record the reordering information, and signals the supplemental enhancement information into the bitstream.

For example, sei_payload(.) of sei_message(.) of sei_rbsp (.) in AVC/HEVC/VVC/EVC. More specifically, as in Tables 2 and 3, a new SEI category is introduced, namely the SEI message of feature map reorder indication(.). The payloadType for the new SEI category may be defined as any number not used by other SEIs, e.g., 183, in which case the syntax structure is as illustrated in Table 2, while Table 3 illustrates the specific syntax element description of the reordering information.

TABLE 2

| | Descriptor |
|---|---|
| sei_payload( payloadType, payloadSize ) { | |
|   if( nal_unit_type = = PREFIX_SEI_NUT ) { | |
|     if( payloadType = = 0 ) | |
|       buffering_period( payloadSize ) | |
|     ... | |
|     if( payloadType = = 183 ) | |
|       feature_map_reorder_indication ( payloadSize ) | |
|   } | |
| } | |

TABLE 3

| | Descriptor |
|---|---|
| feature_map_reorder_indication ( payloadSize ) { | |
|   for( i = 0; i <=frame_width/W; i++ ) { | |
|     for ( j = 0; j <= frame_height/H; j++ ) { | |
|       order_of_channel_in_list[ i ][j] | ue(v) |
|     } | |
|   } | |
| } | |

In the above, the semantic of the syntax element is:

order of channel in list[i][j]: the channel number of the feature map in the i-th row and the j-th column, used to describe the current feature map.

In addition, the information to be encoded by the encoder may further include: a size of a picture input to the network, represented by $image_{size}$; and a size of a picture that has been processed by the network, represented by $image_{processed\_size}$, in order for the back-end network to extract a target box of the picture.

It may be understood that reordering and spatial splicing of the multiple feature maps by the encoder can make full use of the correlation information between the feature maps, and block coding of the current block based on the block-coding candidate motion information list can reduce the number of encoding bits. In this way, not only the reference relationship between the feature maps can be optimized, but also the compression efficiency of the feature map data can be improved, reducing the transmission bitstream and thus improving the coding efficiency of the feature map data.

In another embodiment of the present disclosure, a decoding method provided in the embodiments of the disclosure is applied to a video decoding device, i.e., a decoder. Functions implemented by the method may be achieved by a second processor in the decoder calling a computer program, where the computer program may be stored in a second memory. It can be seen that the decoder includes at least the second processor and the second memory.

Figure 6:
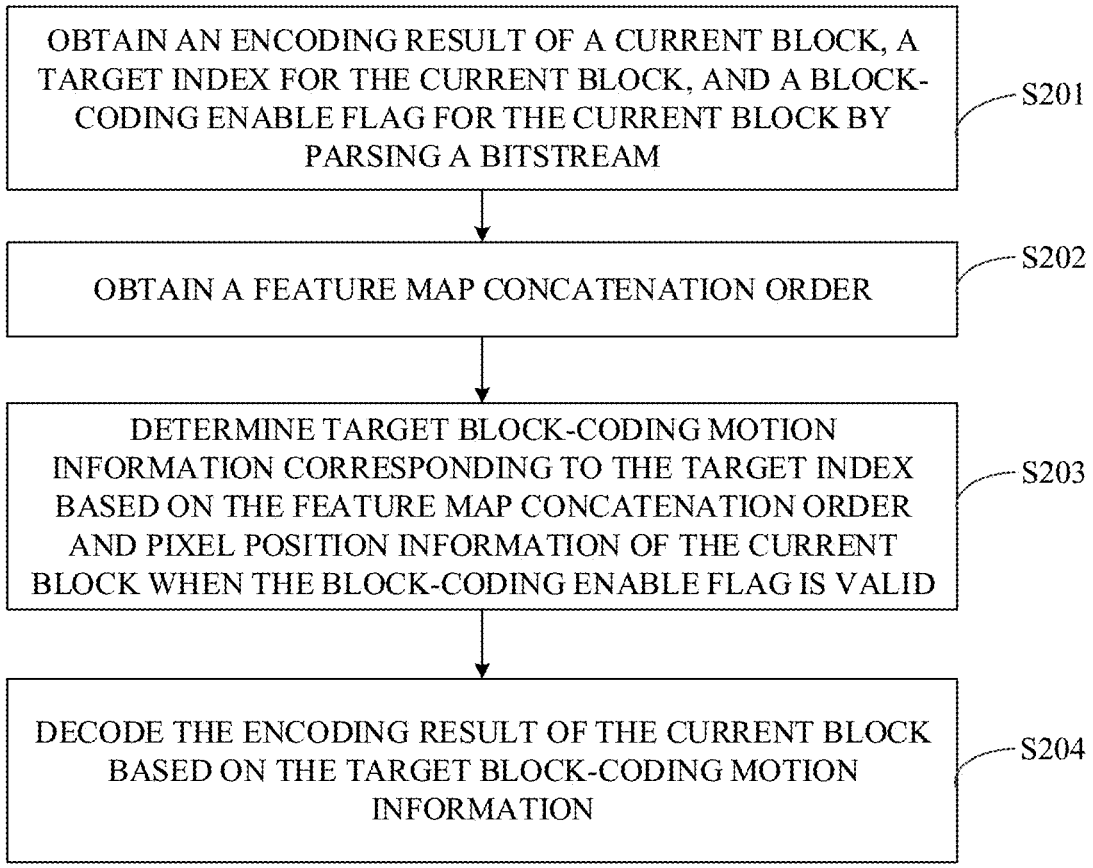
FIG. 6 is a schematic flowchart of a decoding method according to embodiments of the present disclosure.

Referring to FIG. 6, FIG. 6 illustrates a schematic flowchart of a decoding method according to embodiments of the present disclosure. As illustrated in FIG. 6, the method may include the following operations.

At block S201, a bitstream is parsed to obtain an encoding result of a current block, a target index for the current block, and a block-coding enable flag for the current block.

At block S202, a feature map splicing order is obtained.

In the embodiments of the present disclosure, the decoding method is applicable to a decoder of the H.265/HEVC standard, or applicable to a decoder of the H.266/VVC standard, or even applicable to decoders of other standards, such as a decoder of the AVS standard, a decoder of the EVC standard, or the like, which are not specifically limited in the embodiments of the disclosure.

In embodiments of the present disclosure, the decoder may parse the bitstream to obtain the encoding result of the current block, and the target index and the block-coding enable flag for the current block.

In embodiments of the present disclosure, the feature map splicing order may be agreed upon, i.e., preset, or may be transmitted from the encoder which signals the feature map splicing order into the bitstream, and the decoder may parse the feature map splicing order out of the bitstream. The manner of obtaining the feature map splicing is not limited in the embodiments of the present disclosure.

It should be noted that the target index is an index corresponding to target block-coding motion information, and the block-coding enable flag indicates whether an IBC encoding mode is used for the current block. When the block-coding enable flag is valid, it indicates that the IBC encoding mode is used for the current block. When the block-coding enable flag is invalid, it indicates that the IBC encoding mode is not used for the current block.

In embodiments of the present disclosure, whether the block-coding enable flag is valid or invalid may be indicated by numerical values. For example, a value "1" of the flag indicates validity, and a value "0" of the flag indicates invalidity. The numerical values indicating validity and invalidity are not limited in embodiments of the disclosure.

At block S203, when the block-coding enable flag is valid, target block-coding motion information corresponding to the target index is determined based on the feature map splicing order and pixel position information of the current block.

In embodiments of the present disclosure, when the block-coding enable flag is valid, the decoder determines the target block-coding motion information corresponding to the target index based on the feature map splicing order and the obtained pixel position information of the current block.

It should be noted that the pixel position information of the current block can be obtained by parsing the bitstream.

In some embodiments of the present disclosure, the decoder may determine the target block-coding motion information corresponding to the target index based on the feature map splicing order and the pixel position information of the current block in any of the following manners.

The decoder constructs target block-coding motion information corresponding to the target index according to the feature map splicing order, the pixel position information of the current block, and a preset size of an arrangement space for the feature map.

The decoder constructs a block-coding candidate motion information list for the current block according to the feature map splicing order, the pixel position information of the current block, and the preset size of the arrangement space for the feature map, and determines the target block-coding motion information from the block-coding candidate motion information list according to the target index.

In some embodiments of the present disclosure, the decoder obtains the preset size of the arrangement space for the feature map when parsing the bitstream.

In some embodiments of the present disclosure, the decoder may construct only the target block-coding motion information corresponding to the target index based on the feature map splicing order, the pixel position information of the current block, and the preset size of the arrangement space for the feature map. Optionally, the decoder may construct the block-coding candidate motion information list based on the feature map splicing order, the pixel position information of the current block, and the preset size of the arrangement space for the feature map, and then determine the corresponding target block-coding motion information from the block-coding candidate motion information list based on the target index.

In some embodiments of the present disclosure, the principles of constructing the target block-coding motion information corresponding to the target index and constructing the block-coding candidate motion information list by the decoder are the same. The following illustrates an example process in which the decoder constructs the block-coding candidate motion information list for the current block based on the feature map splicing order, the pixel position information for the current block, and the preset size of the arrangement space for the feature map.

In some embodiments of the present disclosure, the decoder determines at least one reference block of the current block according to the pixel position information of the current block, the feature map splicing order, and the size of the arrangement space, determines at least one motion information between the at least one reference block and the current block based on the feature map splicing order and the preset size of the arrangement space for the feature map, and constructs the block-coding candidate motion information list based on the at least one motion information.

The decoder may determine, based on the pixel position information of the current block and the size of the arrangement space, current 2D arrangement position information of a feature map containing the current block, and determine, based on the feature map splicing order and the current 2D arrangement position information, at least one 2D arrangement position information of at least one reference block of the current block, thereby determining the at least one reference block.

It is to be noted that, by dividing the pixel position information of the current block by the size of the arrangement space and rounding up, the decoder may determine the position information of the current block in the feature map where the current block locates, that is, the row and column where the current block is located in a second feature map containing the current block. As such, the current 2D arrangement position information is obtained. In this way, the decoder may find at least one reference block that has been decoded before the current block according to the current 2D arrangement position information and the feature map splicing order, and obtain at least one 2D arrangement position information.

Exemplarily, the pixel position information of the current block is divided by the width of the arrangement space and then rounded up to obtain an abscissa of the current 2D arrangement position information. The pixel position information of the current block is divided by the height of the arrangement space and then rounded up to obtain an ordinate of the current 2D arrangement position information.

In some embodiments of the present disclosure, the decoder may determine the at least one motion information between the at least one reference block and the current block based on the feature map splicing order and the preset size of the arrangement space for the feature map as follows. The decoder determines the at least one motion information according to the at least one 2D arrangement position information, the current 2D arrangement position information, and the preset size of the arrangement space for the feature map.

It is noted that the preset size of the arrangement space for the feature map includes a width of the arrangement space and a height of the arrangement space. The decoder may determine at least one motion information according to the at least one 2D arrangement position information, the current 2D arrangement position information, and the preset size of the arrangement space for the feature map as follows.

The decoder obtains at least one abscissa multiple by determining a difference in abscissa between each of the at least one piece of 2D arrangement position information and the current 2D arrangement position information, obtains at least one ordinate multiple by determining a difference in ordinate between each of the at least one piece of 2D arrangement position information and the current 2D arrangement position information, and obtains the at least one motion information, by determining an abscissa component of the at least one motion information according to the at least one ordinate multiple and the width of the arrangement space and determining an ordinate component of the at least one motion information according to the at least one abscissa multiple and the height of the arrangement space.

In embodiments of the present disclosure, the feature maps are spliced according to the preset size of the arrangement space for the feature map, so that a difference in abscissa component between adjacent feature maps in the same row is the width of the arrangement space, and a difference in the ordinate components between adjacent feature maps in the same column is the height of the arrangement space.

It is to be noted that when determining each reference block of the current block in at least one first feature map, the motion information between each reference block and the current block may be determined according to an integer multiple of the width of the arrangement space and/or the height of the arrangement space. In addition, by using the displacement in terms of the multiple of the width of the arrangement space and/or the height of the arrangement space, the position of the determined reference block in the first feature map is the same as the position of the current block in the second feature map. In this way, the determined reference block is located at the closest and most relevant position to the current block, so that the constructed block-coding candidate motion information list will be the most relevant to the current block. Therefore, using such block-coding candidate motion information list to decode the current block can have a better and accurate coding effect.

In some embodiments of the present disclosure, the preset size of the arrangement space for the feature map is a size of a feature map, or the preset size of the arrangement space for the feature map is a sum of the size of the feature map and arrangement gap position information.

It should be noted that the feature maps may be tightly spliced without gap, in which case the preset size of the arrangement space for the feature map is the size of the feature map. Optionally, the feature maps may be arranged in accordance with an arrangement gap, in which case the preset size of the arrangement space for the feature map is the sum of the size of the feature map and the arrangement gap position information.

The process of determining the at least one motion information according to the at least one 2D arrangement position information, the current 2D arrangement position information, and the preset size of the arrangement space for the feature map by the decoder is consistent with the operation at the encoder, which is not repeated herein.

In some embodiments of the present disclosure, the decoder constructs the block-coding candidate motion information list based on the at least one motion information as follows.

The decoder obtains the block-coding candidate motion information list by arranging the at least one motion information according to the feature map splicing order and determining a mapping relationship between at least one index of block-coding candidate motion information and the at least one motion information, where the at least one index of block-coding candidate motion information is an index of motion information corresponding to the at least one first feature map in an descending order of the feature map splicing order.

It is noted that process of obtaining the block-coding candidate motion information list by arranging the at least one motion information according to the feature map splicing order and determining a mapping relationship between at least one index of block-coding candidate motion information and the at least one motion information by the decoder is consistent with the operation at the encoder, which is not repeated herein.

At block S204, the encoding result of the current block is decoded based on the target block-coding motion information.

In embodiments of the present disclosure, after obtaining the target block-coding motion information, the decoder may decode the current block using the target block-coding motion information, thereby completing the decoding of the current block. After the decoder has decoded all blocks, the decoder may reconstruct one or more quasi-spatial video sequences based on the decoded blocks. The decoder performs an inverse reordering process on the feature maps in each quasi-spatial video sequence to obtain multiple feature maps, and performs relevant post-processing on the multiple feature maps to obtain reconstructed feature map data.

It is noted that the decoder may determine the target block-coding motion information from the block-coding candidate motion information list based on the target index of the target block-coding motion information, and decode the encoding result of the current block using the target block-coding motion information, until all the blocks are decoded, thus obtaining one or more quasi-spatial video sequences.

In some embodiments of the present disclosure, when the decoder parses the bitstream, the decoder may also parse out supplementary enhancement information, and then obtain the reordering information from the supplementary enhancement information.

In some embodiments of the present disclosure, the decoder may perform an inverse reordering process for each quasi-spatial video sequence based on the reordering information to obtain multiple feature maps.

In some embodiments of the present disclosure, the decoder performs form conversion on each quasi-spatial video sequence to obtain at least one feature sequence in the feature map form, and performs the inverse reordering process on the at least one feature sequence based on the reordering information to obtain multiple feature maps.

It is noted that the reordering information includes at least one list, and each list stores the 2D arrangement position information of feature maps arranged in each of the at least one feature sequence and the channel numbers of the multiple channels corresponding to the feature maps.

It should be noted that the quasi-spatial video sequence is represented in YUV form, which needs to be converted into a feature map form, so as to obtain at least one feature sequence in the feature map form. At least two feature maps are contained in each sequence. The at least one feature sequence is then subjected to the reverse reordering process based on the reordering information, so as to obtain multiple feature maps that are arranged in an initial order.

It is also noted that the initial order refers to a channel number order. Since the reordering information may include at least one list and each list stores channel numbers corresponding to feature maps arranged within each of the at least one feature sequences, in some embodiments, the decoder performs the inverse reordering process on the at least one feature sequence based on the reordering information to obtain multiple feature maps as follows. According to the 2D arrangement position information of a feature map arranged in the at least one feature sequence and a channel number of a channel corresponding to the feature map, the decoder inversely reorders the feature map contained in the at least one feature sequence to a channel position corresponding to the channel number, thus obtaining the multiple feature maps arranged in the channel number order.

That is, the decoder converts the decoded YUV sequence back into the feature map form and then uses the reordering information (i.e., List$^l$[ ]) to inversely reorder back to the original channel order, e.g., reordering a feature map at row i and column j of sequence l to an original channel position List$^l$[i, j] of the feature map, thus obtaining multiple feature maps arranged in the channel number order.

It is to be noted that after obtaining the multiple feature maps, the decoder may perform post-processing on the multiple feature maps. The post-processing may include de-quantization, cropping, form conversion, or the like. Specifically, in some embodiments, the decoder may perform relevant post-processing on the multiple feature maps to obtain reconstructed feature map data as follows.

The multiple feature maps each are converted from the feature map form into the array form to obtain multiple third feature data, where each channel corresponds to one of the third feature data, and the third feature data is in the array form. The multiple third feature data each are cropped to obtain multiple second feature data. The multiple second feature data each are de-quantized to obtain multiple first feature data. The multiple first feature data are converted from the array form into the tensor form to obtain multiple feature tensor data. The reconstructed feature map data is obtained according to the multiple feature tensor data.

It should be noted that since the feature map is in the feature map form, the feature map needs to be converted from the feature map form into the array form at first, so that the multiple third feature data may be obtained, where each channel corresponds to one of the third feature data.

It should also be noted that for the multiple third feature data, the third feature data corresponding to each channel is de-quantized and cropped, to obtain second feature data corresponding to each channel. Then the second feature data corresponding to each channel is de-quantized to obtain first feature data corresponding to each channel. Then the first feature data corresponding to each channel is converted from the array form into the tensor form to obtain feature tensor data corresponding to each channel, so as to obtain multiple feature tensor data corresponding to multiple channels. The reconstructed feature map data may be obtained according to the multiple feature tensor data corresponding to the multiple channels. That is, after the feature tensor data corresponding to each channel is obtained, since there are multiple channels, multiple feature tensor data corresponding to the multiple channels may be obtained according to the multiple third feature data, so that the reconstructed feature map data may be reconstructed. It should also be noted that here, not only the third feature data is in the array form, but also each of the second feature data and the first feature data is in the array form.

In some embodiments, the decoder parses the bitstream to obtain the tensor shape which includes the number of channels and a feature tensor size, where the feature tensor size includes a height and width of a feature tensor.

It should be noted that in the encoder, the tensor shape is signalled into the bitstream as the encoding information. Then in the decoder, the tensor shape may be obtained by parsing the bitstream, and is represented by (C, W, H). Here C is the number of channels, W is the width of the feature tensor, H is the height of the feature tensor, and W and H mentioned here are feature tensor sizes.

Further, the decoder crops each of the multiple third feature data to obtain multiple second feature data as follows. The decoder crops array data of the feature tensor size at a preset position from the third feature data corresponding to each channel, and determines the cropped array data as second feature data corresponding to the channel, thus obtaining multiple second feature data.

It should be noted that the feature tensor size (H, W) may be obtained by parsing the bitstream, and the preset position may be an upper left corner of the second feature data. That is, after the form conversion, an array size ($\hat{H}$, $\hat{W}$) corresponding to the third feature data may be obtained. Then, array data of the feature tensor size (H, W) is cropped from the upper left corner of ($\hat{H}$, $\hat{W}$), and the cropped array data is used as the second feature data corresponding to the channel, thus obtaining multiple second feature data.

In some embodiments of the present disclosure, the decoder parses the bitstream to obtain minimum and maximum values corresponding to each channel, and determines first feature data corresponding to each channel by using a third calculation model according to the second feature data as well as the minimum and maximum values corresponding to the channel, thus obtaining multiple first feature data.

It should be noted that for de-quantization, in a specific example, the minimum value (represented by $x_{min}$) and the maximum value (represented by $x_{max}$) corresponding to each channel may be obtained by parsing the bitstream. Then, the second feature data corresponding to each channel is read and dequantized. In this case, a de-quantization formula (i.e., the third calculation model) is as the following formula (6):

$$x_{ij} = \frac{\hat{y}_{ij}(x_{max} - x_{min})}{2^n - 1} + x_{min} \qquad (6)$$

Here, $x_{ij}$ represents data at an i-th row and j-th column in an array (H, W) corresponding to the unquantized first feature data, $x_{min}$ represents a minimum value in the array (H, W) corresponding to the unquantized first feature data, $x_{max}$ represents a maximum value in the array (H, W) corresponding to the unquantized first feature data, $\hat{y}_{ij}$ represents data at an i-th row and j-th column in an array (H, W) corresponding to the quantized second feature data, and n represents the number of bits.

In another specific example, a floating-point formula may be used. De-quantization functions to convert fixed-point data into floating-point data. In this case, the de-quantization formula may be replaced by a floating-point formula as following formula (7):

$$x_{ij} = 2^{\left(\frac{x_{max}}{2^{(2^{BitDepth})-1}} \times float(\hat{y}_{ij})-1\right)} \qquad (7)$$

Here, $x_{ij}$ represents data at an i-th row and j-th column in an array (H, W) corresponding to the unquantized first feature data, $\hat{y}_{ij}$ represents data at an i-th row and j-th column in an array (H, W) corresponding to the quantized second feature data, that is, $\hat{y}_{ij}$ and $x_{ij}$ represent fixed-point data and recovered original floating-point data respectively, float( ) converts input data of an integer type into data of a floating-point type, BitDepth represents the number of fixed-point bits, $x_{max}$ represents a maximum value in the array (H, W) corresponding to the unquantized first feature data, here $x_{max}$ is obtained by parsing the bitstream.

That is to say, when the decoder performs the form conversion, the third feature data may be cropped and de-quantized, and the obtained first feature data in the array form is converted into the tensor form, to obtain the feature tensor data corresponding to each channel. It should be noted that, cropping may be performed before de-quantization, or de-quantization may be performed before cropping. The embodiments of the present disclosure are described taking "first cropping and then de-quantization" as an example, but there is no specific limitation on the order of execution.

In some embodiments of the present disclosure, the decoder performs channel merging on the multiple feature tensor data according to the tensor form to obtain reconstructed feature map data.

That is, the decoder merge the obtained multiple feature tensor data (H, W) into the required tensor form with a shape of (C, H, W) according to corresponding channels. That is, the tensor form is the reconstructed feature map data.

Furthermore, if the information encoded by the encoder further includes a size of a picture input to the network, represented by $image_{size}$, and a size of a picture that has been processed by the network, represented by $image_{processed\_size}$, then in the decoder, $image_{size}$ and $image_{processed\_size}$ need to be obtained by parsing the bitstream for a network detecting a target box, and then image size and $image_{processed\_size}$ are input into a subsequent network for a back-end network to extract a target box of the picture.

In embodiments of the present disclosure, the decoder obtain the reordering information including at least one list by parsing the bitstream, where the reordering information records channel numbers of the feature maps in the feature map data. The at least one list share a centroid feature map, and each list records a channel number of at least one feature map in addition to the channel number of the centroid feature map. This at least one list is used to guide the establishment of reference relationships between feature maps when coding at least one sequence. Specifically, feature maps in the same sequence may be referenced to each other, while feature maps in different sequences may not be referenced to each other. The centroid feature map, as a feature map shared by this at least one list, can only be referenced by other feature maps, and cannot reference other feature maps. In this way, based on the reordering information of the feature maps and the decoded quasi-spatial video sequences obtained, the feature maps are reversely reordered to obtain reconstructed feature map data, which contains feature data of all channels.

It is to be understood that the bitstream is parsed to obtain the encoding result of the current block, the target index, and a block-coding enable flag. The feature map splicing order is obtained. When the block-coding enable flag is valid, the target block-coding motion information corresponding to the target index is determined based on the feature map splicing order and pixel position information of the current block. The encoding result of the current block is decoded based on the target block-coding motion information. In this way, when the current block may be decoded based on the feature map splicing order, block decoding can be performed on the current block based on the target block-coding motion information in the case where block coding is used (i.e., the block-coding enable flag is valid), which reduces the number of operations in decoding. The bitstream is received as the encoding result after the block coding, so the transmission bitstream is reduced. As a result, the decompression efficiency of the feature map data is improved, thus improving the decoding efficiency of the feature map data containing the current block.

In another embodiment of the present disclosure, a detailed process for coding quasi-spatial features is provided. The detailed process may include the following operations.

At S301, an encoder determines multiple feature maps corresponding to multiple channels.

At S302, the encoder performs relevance reordering and spatial splicing on the multiple feature maps to obtain one or more quasi-spatial video sequences and corresponding feature map splicing orders.

At S303, the encoder constructs, for each quasi-spatial video sequence, a block-coding candidate motion information list for a current block according to the feature map splicing order corresponding to the quasi-spatial video sequence.

At S304, the encoder encodes the current block based on target block-coding motion information in the block-coding candidate motion information list to obtain a target index of the the target block-coding motion information and an encoding result, and generates a bitstream.

At S305, a decoder parses the bitstream and obtains the encoding result of the current block, the target index, and the block-coding enable flag.

At S306, the decoder obtains the feature map splicing order.

At S307, when the block-coding enable flag is valid, the decoder determines the target block-coding motion information corresponding to the target index based on the feature map splicing order and pixel position information of the current block.

At S308, the decoder decodes the encoding result of the current block based on the target block-coding motion information, and obtains one or more quasi-spatial video sequences when all blocks are decoded.

At S309, the decoder performs reverse reordering on feature maps in each quasi-spatial video sequence to obtain multiple feature maps.

At S310, the decoder performs relevant post-processing on the multiple feature maps to obtain reconstructed feature map data.

It will be appreciated that embodiments of the present disclosure propose a quasi-spatial feature coding technique. Here, a feature specifically refers to the feature data outputted from the network intermediate layer after the picture or video is input into the preset neural network model. For an picture with a width W1 and a height H1, the corresponding feature data size may be expressed as a tensor shape (C, H, W), where the number of channels is C, the height of the feature tensor size is H, and the width of the feature tensor size is W.

Figure 7:
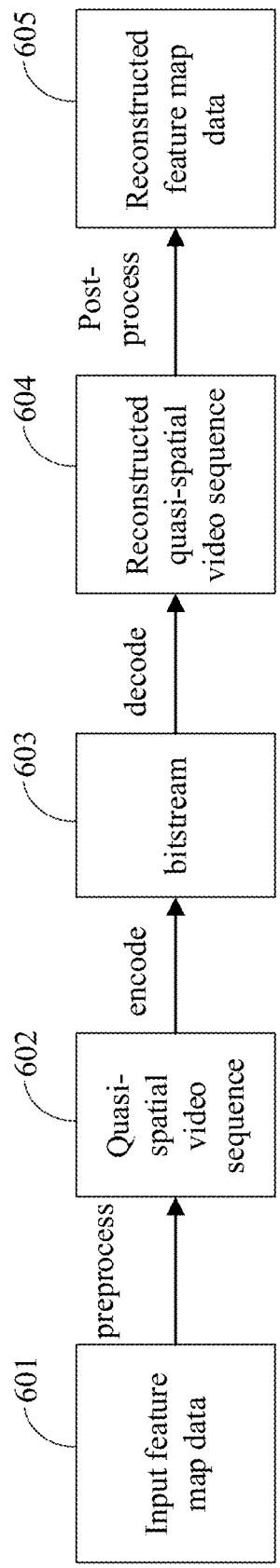
FIG. 7 is a schematic structural diagram of a coding framework for quasi-spatial features according to embodiments of the present disclosure.

It should be noted that the basic idea of the quasi-spatial feature coding technique is illustrated in FIG. 7, which illustrates a schematic structural diagram of a coding framework for quasi-spatial features according to embodiments of the present disclosure. In FIG. 7, the coding framework may include input feature map data 601, quasi-spatial video sequence 602, bitstream 603, reconstructed quasi-spatial video sequence 604, and reconstructed feature map data 605. The input feature map data 601 includes feature data of multiple channels, and both the quasi-spatial video sequence 602 and the reconstructed quasi-spatial video sequence 604 are YUV sequences. Based on the coding framework illustrated in FIG. 7, the following operations may specifically be included.

(1) Preprocessing: the input feature map data 601 is preprocessed and reordered to obtain the quasi-spatial video sequence 602;

(2) Encoding: after block coding is performed on the quasi-spatial video sequence 602, the bitstream 603 is obtained.

(3) Decoding: from the received bitstream, the reconstructed quasi-spatial video sequence 604 is parsed out.

(4) Post-processing: after post-processing is performed on the reconstructed quasi-spatial video sequence 604 according to the reconstructed reordering information obtained by parsing, reconstructed feature map data 605 is obtained, where the reconstructed feature map data 605 is used for a subsequent network to carry out intelligent task processing.

More specifically, the above operations may be subdivided, and each operation will be described in detail below.

Figure 8:
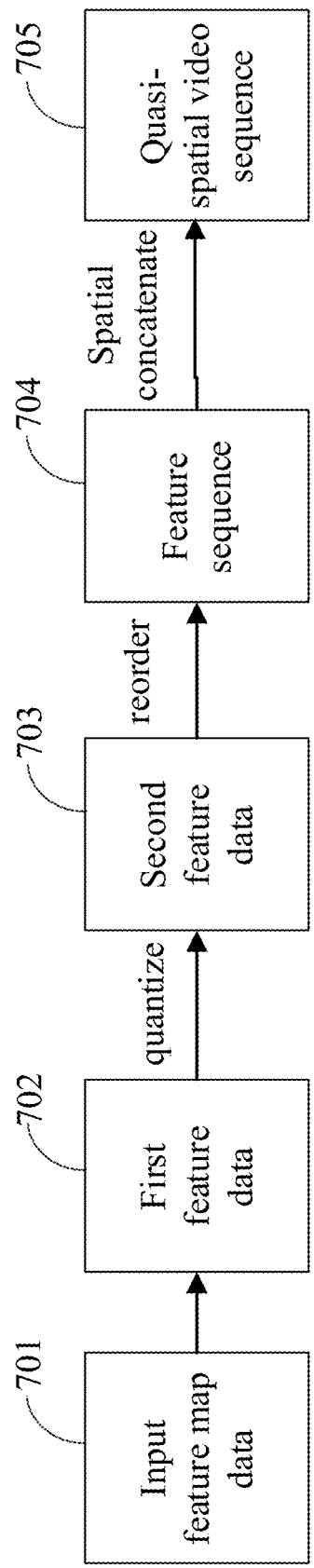
FIG. 8 is a schematic structural diagram of a preprocessing framework according to embodiments of the present disclosure.

(1) Preprocessing: FIG. 8 illustrates a schematic structural diagram of a preprocessing framework according to embodiments of the present disclosure. As illustrated in FIG. 8, the preprocessing framework may include input feature map data 701, first feature data 702, second feature data 703, feature sequence 704, and quasi-spatial video sequence 705. The input feature map data 701 may be converted into the array form by form conversion, to obtain the first feature data 702. The first feature data 702 may be quantized to obtain the second feature data 703. Then the second feature data 703 is subjected to form conversion and other operations, and then reordered to obtain the feature sequence 704. The feature sequence 704 may be spliced to obtain the quasi-spatial video sequence 705, i.e., a YUV sequence.

In addition to the reordering operation, in some cases, the preprocessing may also include operations such as converting features from the tensor form into the array form and quantizing feature data, and the specific operations of quantization are detailed in the above and will not be repeated here.

(2) Encoding: the information to be encoded by the encoder may include the YUV sequence of the quasi-spatial video and other necessary additional data. The other necessary additional data may be the feature tensor shape represented by (C, H, W), the reordering information (e.g., using a list form for storing the information) represented by List$^l$[i, j]=X, the feature splicing order, the target index of the target block-coding motion information, and the block-coding enable flag.

Furthermore, other possible information included are: a size of a picture input to the network, represented by image$_{size}$, a size of a picture that has been processed by the network, represented by image$_{processed\_size}$, and a minimum value and a maximum value corresponding to each channel of the feature tensor, represented by $x_{min}$ and $x_{max}$ respectively.

(3) Decoding: the information to be decoded by the decoder may include the YUV sequence of the reconstructed quasi-spatial video and other necessary decoding information. The other necessary decoding information may be the feature tensor shape, represented by (C, H, W), the reordering information (e.g., using a list form for storing information), represented by List$^l$[i, j]=X, the feature splicing order, the target index of the target block-coding motion information, and the block-coding enable flag.

In a possible implementation, the reordering information may also be recorded in SEI, such as SEI in VVC and HEVC, or extension data of the AVS standard, for example in sei_payload (.) of sei_message (.) in sei_rbsp (.) of AVC/HEVC/VVC/EVC. More specifically, as illustrated in the above Table 1 and Table 2, a new SEI category, i.e., SEI message of feature map reorder indication (.), is added. Table 1 and Table 2 provide a syntax structure and a specific description of syntax elements respectively, which are not elaborated here.

Furthermore, other possible information included after parsing the bitstream are: a size of a picture input to the network, represented by image size, a size of a picture that has been processed by the network, represented by image$_{processed\_size}$, and a minimum value and a maximum value corresponding to each channel of the feature tensor, represented by $x_{min}$ and $x_{max}$ respectively.

Figure 9:
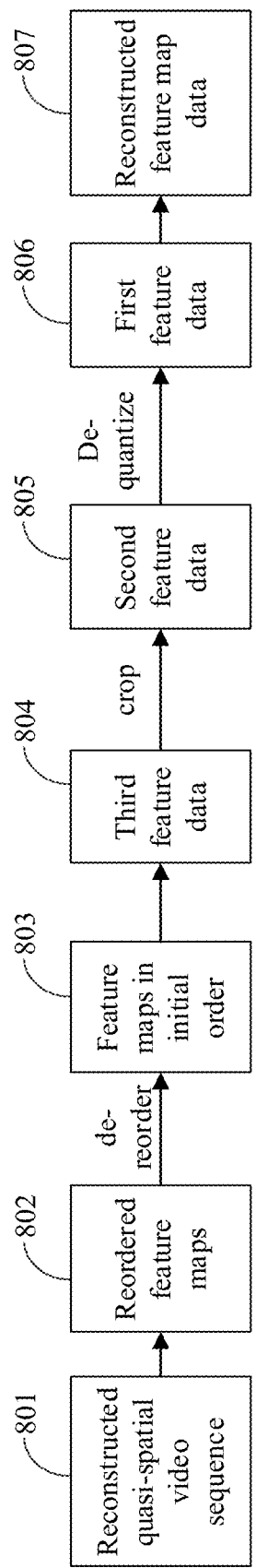
FIG. 9 is a schematic structural diagram of a postprocessing framework according to embodiments of the present disclosure.

(4) Post-processing: FIG. 9 illustrates a schematic structural diagram of a post-processing framework according to embodiments of the disclosure. As illustrated in FIG. 9, the post-processing framework may include a reconstructed quasi-spatial sequence 801, reordered feature maps 802, feature maps 803 in an initial order, third feature data 804, second feature data 805, first feature data 806, and reconstructed feature map data 807. The reconstructed quasi-spatial sequence 801 is a YUV sequence. The reconstructed quasi-spatial sequence 801 is firstly converted into the feature map form to obtain the reordered feature maps 802. The reordered feature maps 802 may be de-reordered to obtain the feature maps 803 in the initial order, i.e., multiple feature maps arranged according to the order of channels. Then, form conversion is performed on the feature maps 803 to obtain the third feature data 804 in the array form. Then, the third feature data 804 is cropped to obtain the cropped second feature data 805, and then the cropped second feature data may be de-quantized to obtain the unquantized first feature data 806. The first feature data 806 is converted from the array form into the tensor form, and merged into the final reconstructed feature map data 807 with a tensor shape represented as (C, H, W).

Specifically, the decoded YUV sequence is converted back to the feature map form, and then the feature maps is de-reordered to an original channel order by using the reordering information ($List^l[\ ]$), that is, a feature map in the i-th row and j-th column of the l-the sequence is reordered to an original channel position $List^l[i, j]$ of the feature map. Then, the feature map at the i-th row and j-th column after de-reordering is read in the array form, and then cropped, for example, array data of the original feature tensor size (H, W) at the upper left corner is cropped. The cropped array is de-quantized, and then the de-quantized array is converted back to a feature tensor (H, W) of a channel at the i-th row and j-th column. Then feature tensors (H, W) of multiple channels are merged into a final feature tensor according to corresponding channels, to obtain the final reconstructed feature map data with a tensor shape of (C, H, W). Alternatively, de-quantization may be performed before cropping. That is, after the feature map at the i-th row and j-th column after de-reordering is read in the array form, the read array is first de-quantized. Then, array data of the original feature tensor size (H, W) is cropped from the upper left corner of the de-quantized array ($\hat{H}, \hat{W}$). Then the cropped array is converted back to the feature tensor (H, W) of the c-channel, which is then merged into a final feature tensor according to corresponding channels, to obtain the final reconstructed feature map data.

Finally, for a target detecting network, information image size and $image_{processed\_size}$ obtained by parsing the bitstream need to be input into a subsequent network to extract a target box of the picture.

The specific implementations of the foregoing embodiments are elaborated in detail by the above embodiments. It can be seen that, with the technical solution of the foregoing embodiments, the multiple feature maps are reordered to make full use of the correlation information between the feature maps, which can improve the coding efficiency of inter coding, and at the same time achieve compression of the feature map data.

Figure 10:
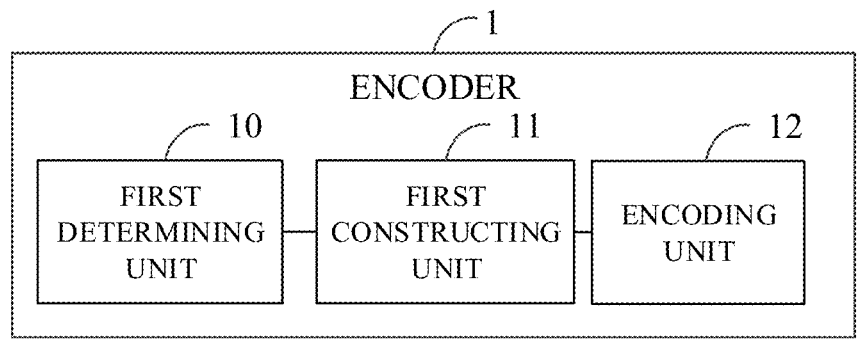
FIG. 10 is a schematic diagram of a composition structure of an encoder according to embodiments of the present disclosure.

Based on the same inventive conception of the preceding embodiments, FIG. 10 illustrates a schematic diagram of a composition structure of an encoder 1 provided by an embodiment of the present disclosure. As illustrated in FIG. 10, the encoder 1 includes a first determining unit 10, a first constructing unit 11, and an encoding unit 12.

The first determining unit 10 is configured to determine multiple feature maps corresponding to multiple channels, and reorder the multiple feature maps by relevance and spatially splice the multiple feature maps, to obtain one or more quasi-spatial video sequences and corresponding feature map splicing orders.

The first constructing unit 11 is configured to construct, for each quasi-spatial video sequence, a block-coding candidate motion information list for a current block according to the feature map splicing order corresponding to the quasi-spatial video sequence.

The encoding unit 12 is configured to encode the current block based on the block-coding candidate motion information list to generate a bitstream.

In some embodiments of the present disclosure, the first constructing unit 11 is further configured to determine, for each quasi-spatial video sequence, at least one motion information between a reference block in at least one first feature map and the current block in a second feature map according to the feature map splicing order, where the at least one first feature map has been encoded before encoding the second feature map, and a first position where the reference block is located in the at least one first feature map is the same as a second position where the current block is located in the second feature map. The first constructing unit 11 is further configured to construct the block-coding candidate motion information list according to the at least one motion information.

In some embodiments of the present disclosure, the first constructing unit 11 is further configured to determine at least one 2D arrangement position information of the at least one reference block in the at least one first feature map and current 2D arrangement position information of the current block according to the feature map splicing order, and determine the at least one motion information according to the at least one 2D arrangement position information, the current 2D arrangement position information, and a preset size of an arrangement space for the feature map.

In some embodiments of the present disclosure, the preset size of the arrangement space for the feature map includes a width of the arrangement space and a height of the arrangement space.

The first constructing unit 11 is further configured to obtain at least one abscissa multiple by determining a difference in abscissa between each of the at least one 2D arrangement position information and the current 2D arrangement position information, obtain at least one ordinate multiple by determining a difference in ordinate between each of the at least one 2D arrangement position information and the current 2D arrangement position information, and obtain the at least one motion information, by determining an abscissa component of the at least one motion information according to the at least one ordinate multiple and the width of the arrangement space and determining an ordinate component of the at least one motion information according to the at least one abscissa multiple and the height of the arrangement space.

In some embodiments of the present disclosure, the first constructing unit 11 is further configured to obtain the block-coding candidate motion information list, by arranging the at least one motion information corresponding to the at least one first feature map according to the feature map splicing order and determining a mapping relationship between at least one index of block-coding candidate motion information and the at least one motion information.

The at least one index of block-coding candidate motion information is an index of motion information corresponding to the at least one first feature map in a descending order of the feature map splicing order.

In some embodiments of the present disclosure, the encoding unit 12 is further configured to traverse the at least one motion information in the block-coding candidate motion information list and calculate at least one rate-distortion cost corresponding to the at least one motion information, determine target block-coding motion information based on the at least one rate-distortion cost, obtain an encoding result by encoding the current block with the target block-coding motion information, and signals the encoding result into the bitstream.

In some embodiments of the present disclosure, the encoding unit 12 is further configured to obtain best motion information determined in other motion search method, calculate a first rate-distortion cost for the best motion information, and compare the at least one rate-distortion cost and the first rate-distortion cost and determine motion information corresponding to a minimum rate-distortion cost as the target block-coding motion information.

In some embodiments of the present disclosure, the encoding unit 12 is further configured to determine motion information corresponding to the minimum rate-distortion cost in the at least one rate-distortion cost as the target block-coding motion information.

In some embodiments of the present disclosure, the encoding unit 12 is further configured to generate a valid block-coding enable flag when the target block-coding motion information belongs to the at least one motion information, generate an invalid block-coding enable flag when the target block-coding motion information does not belong to the at least one motion information, obtain a target index of the target block-coding motion information, and signal the block-coding enable flag and the target index into the bitstream.

In some embodiments of the present disclosure, the first determining unit 10 is further configured to cluster the multiple feature maps corresponding to the multiple channels to determine a target feature map for at least one cluster, where the target feature map is in one-to-one correspondence with the at least one cluster. The first determining unit 10 is further configured to reorder the multiple feature maps according to the target feature map for each cluster and determine, for each cluster, a feature sequence and a feature map splicing order for the feature sequence. The first determining unit 10 is further configured to spatially splice, for each cluster, feature maps in the feature sequence according to the feature map splicing order for the feature sequence to obtain a quasi-spatial sequence corresponding to the cluster, to obtain one or more quasi-spatial sequences, and perform form conversion on the one or more quasi-spatial sequences to obtain the one or more quasi-spatial video sequences.

In some embodiments of the present disclosure, the feature sequence for each cluster includes S feature maps corresponding to different channels, where S is an integer greater than 1.

The first determining unit 10 is further configured to determine a preset arrangement number of feature maps in each row or each column according to the number of the S feature maps, and splice, for each cluster, the S feature maps in the feature sequence in a preset arrangement manner based on the preset arrangement number according to the feature map splicing order for the feature sequence, so as to obtain, for each feature map in the feature sequence, 2D arrangement position information in an arrangement of M rows and N columns, and obtain a spliced quasi-spatial sequence corresponding to the cluster, where M and N each are an integer greater than 1. The first determining unit 10 is further configured to obtain the one or more quasi-spatial sequences when splicing has been performed for all clusters.

In some embodiments of the present disclosure, the encoding unit 12 is further configured to signal the preset size of the arrangement space for the feature map into the bitstream.

In some embodiments of the present disclosure, the preset size of the arrangement space for the feature map is a size of the feature map, or the preset size of the arrangement space for the feature map is a sum of the size of the feature map and arrangement gap position information.

In some embodiments of the present disclosure, the first determining unit 10 is further configured to pad the M-th row with feature maps until the preset arrangement number is reached when the number of feature maps in the M-th row is less than the preset arrangement number.

In some embodiments of the present disclosure, the first determining unit 10 is further configured to set the target feature map for each cluster to be a 0-th element in the feature sequence for the cluster, among the feature sequence for the at least one cluster; when the (i+1)-th set of remaining feature maps is non-empty, for each feature map in the (i+1)-th set of remaining feature maps, calculate a distance between the feature map and an i-th feature map in each feature sequence, and determine a feature map for at least one cluster according to the multiple calculated distances and set the feature map as an (i+1)-th element in the feature sequence for the corresponding cluster, where the (i+1)-th set of remaining feature maps includes remaining feature maps of the multiple feature maps other than feature maps that have been set at the preceding i positions of the feature sequence for each of the at least one cluster, and i is an integer greater than or equal to 0; perform i=i+1, until the (i+H)-th set of remaining feature maps is empty, so that the feature sequence for the at least one cluster is obtained, as well as the feature map splicing order for the feature sequence for each cluster, where H is an integer greater than 1

In some embodiments of the present disclosure, the first determining unit 10 is further configured to cluster the multiple feature maps of the multiple channels into at least one cluster, determine a centroid of each of the at least one cluster to obtain at least one centroid, and determine, based on the at least one centroid, a target feature map for the at least one cluster from the multiple feature maps, where the target feature map represents a feature map in the multiple feature maps that has a minimum distance to a centroid of the at least one centroid.

In some embodiments of the present disclosure, the first determining unit 10 is further configured to determine supplemental enhancement information, where the supplemental enhancement information is used to record the reordering information.

The encoding unit 12 is further configured to signal the supplementary enhancement information into the bitstream.

In some embodiments of the present disclosure, the first determining unit 10 is further configured to obtain a picture to-be-processed, perform feature extraction and preprocessing on the picture to-be-processed with a preset neural network model to obtain the multiple feature maps, where the multiple feature maps include feature data of the multiple channels.

It is understood that in the process performed by the encoder, multiple feature maps corresponding to multiple channels are determined. The multiple feature maps are reordered by relevance and spatially spliced to obtain one or more quasi-spatial video sequences and corresponding feature map splicing orders. For each quasi-spatial video sequence, a block-coding candidate motion information list for a current block is constructed according to the feature map splicing order corresponding to the quasi-spatial video sequence. The current block is encoded based on the block-coding candidate motion information list to generate a bitstream. In this way, multiple feature maps are reordered and spatially spliced, which can fully utilize correlation information between feature maps, and block coding may be further performed on the current block based on the block-coding candidate motion information list, which can reduce the number of encoding operations. As such, not only reference relationship between feature maps can be optimized, but also the compression efficiency of feature map data can be improved, thus reducing the transmitted bitstream and improving coding efficiency of feature map data.

The integrated unit may be stored in a computer-readable storage medium if it is implemented in the form of a software function module and is not sold or used as a stand-alone product. Based on such understanding, the technical solution in the embodiments, in essence, or the portion that contributes to the existing technology, or all or part of the technical solution, can be reflected in the form of a software product, which is stored in a storage medium, including several instructions to enable a computer device (which can be a personal computer, server, or network device, etc.) or processor to execute all or part of the operations of the method described in the embodiments. The aforementioned storage medium include USB flash drives, mobile hard drives, read only memory (ROM), random access memory (RAM), magnetic disks or optical discs, and other media that can store program codes.

Accordingly, embodiments of the present disclosure provide a computer storage medium applied to the encoder 1. The computer storage medium stores a computer program, and the computer program when executed by the first processor realizes the encoding method described in any of the preceding embodiments.

Figure 11:
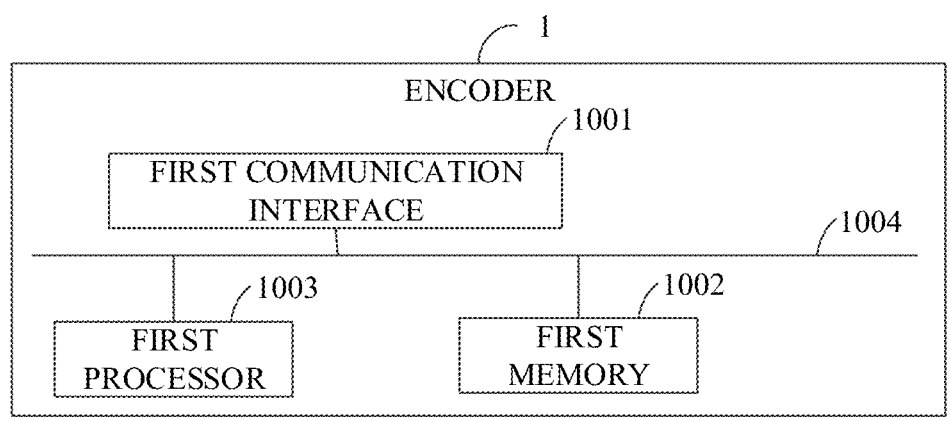
FIG. 11 is a schematic diagram of a hardware structure of an encoder according to embodiments of the present disclosure.

Based on the above composition of the encoder 1 and the computer storage medium, FIG. 11 illustrates a schematic diagram of a hardware structure of the encoder 1 provided by embodiments of the present disclosure. As illustrated in FIG. 11, the encoder may include a first communication interface 1001, a first memory 1002, and a first processor 1003. The components are coupled together via a first bus system 1004. It is to be understood that the first bus system 1004 is configured to realize connection and communication between these components. The first bus system 1004 includes a power bus, a control bus, and a status signal bus, in addition to a data bus. However, for clarity of illustration, the various buses are labeled as first bus system 1004 in FIG. 11.

The first communication interface 1001 is configured to receive and transmit signals during communicating information with other external network elements.

The first memory 1002 is configured to store a computer program capable of running on the first processor.

The first processor 1003 is configured to execute the following operations when running the computer program: determining multiple feature maps corresponding to multiple channels; reordering the multiple feature maps by relevance and spatially splicing the multiple feature maps, to obtain one or more quasi-spatial video sequences and corresponding feature map splicing orders; constructing, for each quasi-spatial video sequence, a block-coding candidate motion information list for a current block according to the feature map splicing order corresponding to the quasi-spatial video sequence; and encoding the current block based on the block-coding candidate motion information list to generate a bitstream.

It will be appreciated that the first memory 1002 in embodiments of the present disclosure may be volatile memory or non-volatile memory, or may include both volatile and non-volatile memory. The non-volatile memory may be read-only memory (ROM), programmable read-only memory (PROM), erasable programmable read-only memory (EPROM), electrically erasable programmable read-only memory (EEPROM), or electrically EPROM, EEPROM) or flash memory. The volatile memory may be random access memory (RAM), which is used as an external cache. By way of illustration, but not limitation, many forms of RAM are available, such as Static RAM (SRAM), Dynamic RAM (DRAM), Synchronous DRAM (SDRAM), Double Data Rate SDRAM (SDRAM), and Flash memory. DRAM, Synchronous DRAM (SDRAM), Double Data Rate SDRAM (DDRSDRAM), Enhanced Synchronous SDRAM (ESDRAM), Synchlink DRAM (SLDRAM) and Direct Rambus RAM (DRRAM). The first memory 1002 of the systems and methods described in this disclosure is intended to include, but is not limited to, these and any other suitable types of memory.

Furthermore, the first processor 1003 may be an integrated circuit chip with a signal processing capability. During implementation, operations of the foregoing methods may be completed by an integrated logical circuit in a hardware form in the first processor 1003 or an instruction in a software form. The first processor 1003 may be a general-purpose processor, a digital signal processor (DSP), an application specific integrated circuit (ASIC), a field programmable gate array (FPGA), or another programmable logic device, a discrete gate or a transistor logic device, a discrete hardware component, or the like. The methods, operations and logical block diagrams disclosed in the embodiments of the disclosure may be implemented or performed by the first processor. The general-purpose processor may be a microprocessor, or the processor may be any conventional processor or the like. Operations of the methods disclosed in combination with the embodiments of the disclosure may be directly embodied to be executed and completed by a hardware decoding processor or executed and completed by a combination of hardware in the decoding processor and software modules. The software module may be located in a mature storage medium in the art, such as RAM, a flash memory, ROM, PROM, EEPROM, a register, or the like. The storage medium is located in the first memory 1002, and the first processor 1003 reads information in the first memory 1002, and completes operations of the above methods in combination with the hardware thereof.

It may be understood that these embodiments described in the disclosure may be implemented by hardware, software, firmware, middleware, microcode, or a combination thereof. For implementation based on hardware, the processing unit may be implement in one or more ASICs, DSP, a DSP Device (DSPD), a programmable logic device (PLD), FPGA, a general-purpose processor, a controller, a microcontroller, a microprocessor, other electronic units configured to perform the functions described in the disclosure, or a combination thereof. For implementation based on software, technologies described in the disclosure may be implemented by modules (e.g., processes, functions, or the like) performing the functions described in the disclosure. Software codes may be stored in the memory and executed by the processor. The memory may be implemented in the processor or outside the processor.

Optionally, in another embodiment, the first processor 1003 is further configured to perform the method according to any one of the foregoing embodiments when executing the computer program.

Figure 12:
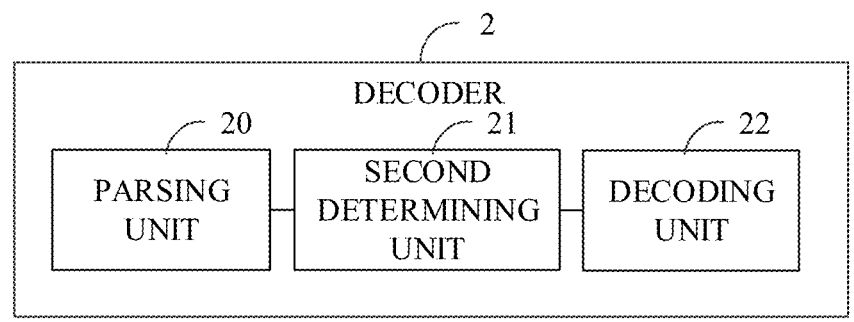
FIG. 12 is a schematic diagram of a composition structure of a decoder according to embodiments of the present disclosure.

Based on the same inventive conception of the preceding embodiments, FIG. 12 illustrates a schematic diagram of a composition structure of a decoder 2 provided in embodiments of the present disclosure. As illustrated in FIG. 12, the decoder 2 includes a parsing unit 20, a second determining unit 21, and a decoding unit 22.

The parsing unit 20 is configured to obtain an encoding result of a current block, a target index for the current block, and a block-coding enable flag for the current block by parsing a bitstream.

The second determining unit 21 is configured to obtain a feature map splicing order and determine target block-coding motion information corresponding to the target index based on the feature map splicing order and pixel position information of the current block when the block-coding enable flag is valid.

The decoding unit 22 is configured to decode the encoding result of the current block based on the target block-coding motion information.

In some embodiments of the present disclosure, the parsing unit 20 is further configured to obtain a preset size of an arrangement space for a feature map when parsing the bitstream.

In some embodiments of the present disclosure, the second determining unit 21 is further configured to construct the target block-coding motion information corresponding to the target index according to the feature map splicing order, the pixel position information of the current block, and the preset size of the arrangement space for the feature map.

Optionally, the second determining unit 21 is further configured to construct a block-coding candidate motion information list for the current block according to the feature map splicing order, the pixel position information of the current block, and the preset size of the arrangement space for the feature map, and determine the target block-coding motion information from the block-coding candidate motion information list according to the target index.

In some embodiments of the present disclosure, the second determining unit 21 is further configured to determine at least one reference block of the current block according to the pixel position information of the current block, the feature map splicing order, and the preset size of the arrangement space, and determine at least one motion information between the at least one reference block and the current block according to the feature map splicing order and the preset size of the arrangement space for the feature map, and construct the block-coding candidate motion information list according to the at least one motion information.

In some embodiments of the present disclosure, the second determining unit 21 is further configured to determine current 2D arrangement position information of a feature map containing the current block according to the pixel position information of the current block and the preset size of the arrangement space, and determine the at least one reference block by determining at least one 2D arrangement position information of the at least one reference block of the current block according to the feature map splicing order and the current 2D arrangement position information.

In some embodiments of the present disclosure, determining the at least one motion information between the at least one reference block and the current block according to the feature map splicing order and the preset size of the arrangement space for the feature map includes: determining the at least one motion information according to the at least one 2D arrangement position information, the current 2D arrangement position information, and the preset size of the arrangement space for the feature map.

In some embodiments of the present disclosure, the preset size of the arrangement space for the feature map includes a width of the arrangement space and a height of the arrangement space.

The second determining unit 21 is further configured to obtain at least one abscissa multiple by determining a difference in abscissa between each of the at least one 2D arrangement position information and the current 2D arrangement position information; obtain at least one ordinate multiple by determining a difference in ordinate between each of the at least one 2D arrangement position information and the current 2D arrangement position information; and obtain the at least one motion information, by determining an abscissa component of the at least one motion information according to the at least one ordinate multiple and the width of the arrangement space and determining an ordinate component of the at least one motion information according to the at least one abscissa multiple and the height of the arrangement space.

In some embodiments of the present disclosure, the second determining unit 21 is further configured to obtain the block-coding candidate motion information list, by arranging the at least one motion information according to the feature map splicing order and determining a mapping relationship between at least one index of block-coding candidate motion information and the at least one motion information, where the at least one index of block-coding candidate motion information is an index of motion information corresponding to the at least one first feature map in an descending order of the feature map splicing order.

It is understood that, in the process performed by the decoder, an encoding result of a current block, a target index for the current block, and a block-coding enable flag for the current block are obtained by parsing a bitstream. A feature map splicing order is obtained. When the block-coding enable flag is valid, target block-coding motion information corresponding to the target index is determined based on the feature map splicing order and pixel position information of the current block. The encoding result of the current block is decoded based on the target block-coding motion information. In this way, multiple feature maps are reordered and spatially spliced, which can fully utilize correlation information between feature maps, and block coding may be further performed on the current block based on the block-coding candidate motion information list, which can reduce the number of encoding bits. As such, not only reference relationship between feature maps can be optimized, but also the compression efficiency of feature map data can be improved, thus reducing the transmitted bitstream and improving coding efficiency of feature map data.

Figure 13:
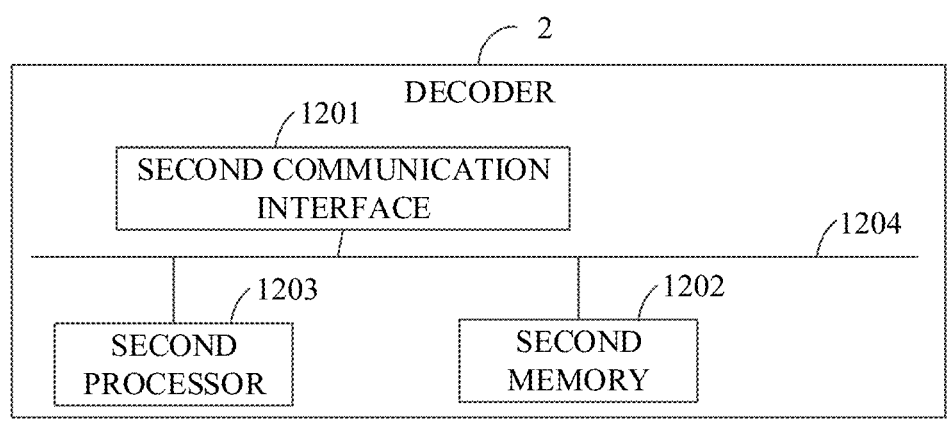
FIG. 13 is a schematic diagram of a hardware structure of a decoder according to embodiments of the present disclosure.

Based on the above composition of the decoder 2 and the computer storage medium, FIG. 13 illustrates a schematic diagram of a hardware structure of the decoder 2 provided in embodiments of the present disclosure. As illustrated in FIG. 13, the decoder may include a second communication interface 1201, a second memory 1202, and a second processor 1203. The components are coupled together via a second bus system 1204. It is to be understood that the second bus system 1204 is configured to achieve connection and communication between these components. The second bus system 1204 includes a power bus, a control bus, and a status signal bus, in addition to a data bus. However, for clarity of illustration, the various buses are labeled as second bus system 1204 in FIG. 13.

The second communication interface 1201 is configured to receive and transmit signals during communicating information with other external network elements.

The second memory 1202 is configured to store a computer program capable of running on the second processor 1203.

The second processor 1203 is configured to execute the following operations when running the computer program: obtaining an encoding result of a current block, a target index for the current block, and a block-coding enable flag for the current block by parsing a bitstream; obtaining a feature map splicing order; determining target block-coding motion information corresponding to the target index based on the feature map splicing order and pixel position information of the current block when the block-coding enable flag is valid; and decoding the encoding result of the current block based on the target block-coding motion information.

Optionally, as another embodiment, the second processor 1203 is further configured to perform the decoding method described in any of the preceding embodiments when running the computer program.

It will be appreciated that the second memory 1202 is similar in hardware function to the first memory 1002, and the second processor 1203 is similar in hardware function to the first processor 1003. The details will not be repeated herein.

The above mentioned are only specific embodiments of the present disclosure, but the scope of protection of the present disclosure is not limited thereto, and any person skilled in the art who is familiar with the technical field can easily think of changes or substitutions within the technical scope disclosed in the present disclosure, and these changes or substitutions shall be covered by the scope of protection of the present disclosure. Therefore, the scope of protection of this disclosure shall be subject to the scope of protection of the claims.

INDUSTRIAL APPLICABILITY

In the embodiments of the disclosure, in the process performed by the encoder, multiple feature maps corresponding to multiple channels are determined. The multiple feature maps are reordered by relevance and spatially spliced to obtain one or more quasi-spatial video sequences and corresponding feature map splicing orders. For each quasi-spatial video sequence, a block-coding candidate motion information list for a current block is constructed according to the feature map splicing order corresponding to the quasi-spatial video sequence. The current block is encoded based on the block-coding candidate motion information list to generate a bitstream. In the process performed by the decoder, an encoding result of a current block, a target index for the current block, and a block-coding enable flag for the current block are obtained by parsing a bitstream. A feature map splicing order is obtained. When the block-coding enable flag is valid, target block-coding motion information corresponding to the target index is determined based on the feature map splicing order and pixel position information of the current block. The encoding result of the current block is decoded based on the target block-coding motion information. In this way, multiple feature maps are reordered and spatially spliced, which can fully utilize correlation information between feature maps, and block coding may be further performed on the current block based on the block-coding candidate motion information list, which can reduce the number of encoding bits. As such, not only reference relationship between feature maps can be optimized, but also the compression efficiency of feature map data can be improved, thus reducing the transmitted bitstream and improving coding efficiency of feature map data.

What is claimed is:

1. A decoding method, applied to a decoder and comprising:
    obtaining an encoding result of a current block, a target index for the current block, and a block-coding enable flag for the current block by parsing a bitstream;
    obtaining a feature map splicing order;
    determining target block-coding motion information corresponding to the target index based on the feature map splicing order and pixel position information of the current block when the block-coding enable flag is valid; and
    decoding the encoding result of the current block based on the target block-coding motion information.

2. The method of claim 1, further comprising:
    obtaining a preset size of an arrangement space for a feature map when parsing the bitstream.

3. The method of claim 2, wherein determining the target block-coding motion information corresponding to the target index based on the feature map splicing order and the pixel position information of the current block comprises:
    constructing the target block-coding motion information corresponding to the target index according to the feature map splicing order, the pixel position information of the current block, and the preset size of the arrangement space for the feature map.

4. The method of claim 2, wherein determining the target block-coding motion information corresponding to the target index based on the feature map splicing order and the pixel position information of the current block comprises:
    constructing a block-coding candidate motion information list for the current block according to the feature map splicing order, the pixel position information of the current block, and the preset size of the arrangement space for the feature map; and
    determining the target block-coding motion information from the block-coding candidate motion information list according to the target index.

5. The method of claim 4, wherein constructing the block-coding candidate motion information list for the current block according to the feature map splicing order, the pixel position information of the current block, and the preset size of the arrangement space for the feature map comprises:
    determining at least one reference block of the current block according to the pixel position information of the current block, the feature map splicing order, and the preset size of the arrangement space;
    determining at least one motion information between the at least one reference block and the current block according to the feature map splicing order and the preset size of the arrangement space for the feature map; and
    constructing the block-coding candidate motion information list according to the at least one motion information.

6. The method of claim 5, wherein determining the at least one reference block of the current block according to the pixel position information of the current block, the feature map splicing order, and the preset size of the arrangement space comprises:

determining current two-dimensional (2D) arrangement position information of a feature map containing the current block according to the pixel position information of the current block and the preset size of the arrangement space; and determining the at least one reference block by determining at least one 2D arrangement position information of the at least one reference block of the current block according to the feature map splicing order and the current 2D arrangement position information.

7. The method of claim 6, wherein determining the at least one motion information between the at least one reference block and the current block according to the feature map splicing order and the preset size of the arrangement space for the feature map comprises:

determining the at least one motion information according to the at least one 2D arrangement position information, the current 2D arrangement position information, and the preset size of the arrangement space for the feature map.

8. The method of claim 7, wherein the preset size of the arrangement space for the feature map comprises a width of the arrangement space and a height of the arrangement space, and determining the at least one motion information according to the at least one 2D arrangement position information, the current 2D arrangement position information, and the preset size of the arrangement space for the feature map comprises:

obtaining at least one abscissa multiple by determining a difference in abscissa between each of the at least one 2D arrangement position information and the current 2D arrangement position information;

obtaining at least one ordinate multiple by determining a difference in ordinate between each of the at least one 2D arrangement position information and the current 2D arrangement position information; and obtaining the at least one motion information, by determining an abscissa component of the at least one motion information according to the at least one ordinate multiple and the width of the arrangement space and determining an ordinate component of the at least one motion information according to the at least one abscissa multiple and the height of the arrangement space.

9. The method of claim 5, wherein constructing the block-coding candidate motion information list according to the at least one motion information comprises:

obtaining the block-coding candidate motion information list, by arranging the at least one motion information according to the feature map splicing order and determining a mapping relationship between at least one index of block-coding candidate motion information and the at least one motion information;

wherein the at least one index of block-coding candidate motion information is an index of motion information corresponding to a feature map containing the current block in a descending order of the feature map splicing order.

10. An encoding method, applied to an encoder and comprising:

determining a plurality of feature maps corresponding to a plurality of channels;

reordering the plurality of feature maps by relevance and spatially splicing the plurality of feature maps, to obtain one or more quasi-spatial video sequences and corresponding feature map splicing orders;

constructing, for each quasi-spatial video sequence, a block-coding candidate motion information list for a current block according to the feature map splicing order corresponding to the quasi-spatial video sequence; and encoding the current block based on the block-coding candidate motion information list to generate a bitstream.

11. The method of claim 10, wherein constructing, for each quasi-spatial video sequence, the block-coding candidate motion information list for the current block according to the feature map splicing order corresponding to the quasi-spatial video sequence comprises:

determining, for each quasi-spatial video sequence, at least one motion information between a reference block in at least one first feature map and the current block in a second feature map according to the feature map splicing order, wherein the at least one first feature map has been encoded before encoding the second feature map, and a first position where the reference block is located in the at least one first feature map is the same as a second position where the current block is located in the second feature map; and constructing the block-coding candidate motion information list according to the at least one motion information.

12. The method of claim 11, wherein determining, for each quasi-spatial video sequence, the at least one motion information between the reference block in at least one first feature map and the current block in the second feature map according to the feature map splicing order comprises:

determining at least one two-dimensional (2D) arrangement position information of the at least one reference block in the at least one first feature map and current 2D arrangement position information of the current block according to the feature map splicing order; and determining the at least one motion information according to the at least one 2D arrangement position information, the current 2D arrangement position information, and a preset size of an arrangement space for the feature map.

13. The method of claim 12, wherein the preset size of the arrangement space for the feature map comprises a width of the arrangement space and a height of the arrangement space, and determining the at least one motion information according to the at least one 2D arrangement position information, the current 2D arrangement position information, and the preset size of the arrangement space for the feature map comprises:

obtaining at least one abscissa multiple by determining a difference in abscissa between each of the at least one 2D arrangement position information and the current 2D arrangement position information;

obtaining at least one ordinate multiple by determining a difference in ordinate between each of the at least one 2D arrangement position information and the current 2D arrangement position information; and obtaining the at least one motion information, by determining an abscissa component of the at least one motion information according to the at least one ordinate multiple and the width of the arrangement space and determining an ordinate component of the at least one motion information according to the at least one abscissa multiple and the height of the arrangement space.

14. The method of claim 11, wherein constructing the block-coding candidate motion information list according to the at least one motion information comprises:
  obtaining the block-coding candidate motion information list, by arranging the at least one motion information corresponding to the at least one first feature map according to the feature map splicing order and determining a mapping relationship between at least one index of block-coding candidate motion information and the at least one motion information, wherein
  the at least one index of block-coding candidate motion information is an index of motion information corresponding to the at least one first feature map in a descending order of the feature map splicing order.

15. The method of claim 11, wherein encoding the current block based on the block-coding candidate motion information list to generate the bitstream comprises:
  traversing the at least one motion information in the block-coding candidate motion information list and calculating at least one rate-distortion cost corresponding to the at least one motion information;
  determining target block-coding motion information based on the at least one rate-distortion cost;
  obtaining an encoding result by encoding the current block with the target block-coding motion information; and
  signalling the encoding result into the bitstream.

16. The method of claim 15, wherein determining the target block-coding motion information based on the at least one rate-distortion cost comprises:
  obtaining best motion information determined in other motion search method;
  calculating a first rate-distortion cost for the best motion information; and
  comparing the at least one rate-distortion cost and the first rate-distortion cost and determining motion information corresponding to a minimum rate-distortion cost as the target block-coding motion information.

17. The method of claim 15, wherein determining the target block-coding motion information based on the at least one rate-distortion cost comprises:
  determining motion information corresponding to a minimum rate-distortion cost in the at least one rate-distortion cost as the target block-coding motion information.

18. The method of claim 15, further comprising:
  generating a valid block-coding enable flag when the target block-coding motion information belongs to the at least one motion information;
  generating an invalid block-coding enable flag when the target block-coding motion information does not belong to the at least one motion information;
  obtaining a target index of the target block-coding motion information; and
  signalling the block-coding enable flag and the target index into the bitstream.

19. The method of claim 10, wherein reordering the plurality of feature maps by relevance and spatially splicing the plurality of feature maps to obtain one or more quasi-spatial video sequences and corresponding feature map concatenation orders comprises:
  clustering the plurality of feature maps corresponding to the plurality of channels to determine a target feature map for at least one cluster, wherein the target feature map is in one-to-one correspondence with the at least one cluster;
  reordering the plurality of feature maps according to the target feature map for each cluster and determining, for each cluster, a feature sequence and a feature map splicing order for the feature sequence;
  spatially splicing, for each cluster, feature maps in the feature sequence according to the feature map splicing order for the feature sequence to obtain a quasi-spatial sequence corresponding to the cluster, to obtain one or more quasi-spatial sequences; and
  performing form conversion on the one or more quasi-spatial sequences to obtain the one or more quasi-spatial video sequences.

20. A decoder, comprising:
  a processor and a memory storing a computer program which, when executed by the processor, causes the processor to:
    obtain an encoding result of a current block, a target index for the current block, and a block-coding enable flag for the current block by parsing a bitstream;
    obtain a feature map splicing order and determine target block-coding motion information corresponding to the target index based on the feature map splicing order and pixel position information of the current block when the block-coding enable flag is valid; and
    decode the encoding result of the current block based on the target block-coding motion information.

* * * * *